US010432514B2

(12) United States Patent
Li

(10) Patent No.: US 10,432,514 B2
(45) Date of Patent: *Oct. 1, 2019

(54) MULTIPROTOCOL LABEL SWITCHING TRAFFIC ENGINEERING TUNNEL ESTABLISHING METHOD AND DEVICE

(71) Applicant: Huawei Technologies Co., Ltd., Shenzhen (CN)

(72) Inventor: Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

This patent is subject to a terminal disclaimer.

(21) Appl. No.: 15/698,197

(22) Filed: Sep. 7, 2017

(65) Prior Publication Data

US 2017/0373968 A1 Dec. 28, 2017

Related U.S. Application Data

(63) Continuation of application No. 14/561,350, filed on Dec. 5, 2014, now Pat. No. 9,769,067, which is a
(Continued)

(30) Foreign Application Priority Data

Jun. 6, 2012 (CN) .......................... 2012 1 0184022

(51) Int. Cl.
*H04L 12/723* (2013.01)
*H04L 12/24* (2006.01)
(Continued)

(52) U.S. Cl.
CPC .......... *H04L 45/50* (2013.01); *H04L 41/0654* (2013.01); *H04L 45/02* (2013.01);
(Continued)

(58) Field of Classification Search
CPC ......... H04L 45/50; H04L 45/36; H04L 45/02; H04L 41/0654; H04L 41/06; H04L 47/828; H04L 47/825
(Continued)

(56) References Cited

U.S. PATENT DOCUMENTS 6,665,273 B1 12/2003 Goguen et al.
2002/0136223 A1 9/2002 Ho
(Continued)

FOREIGN PATENT DOCUMENTS

CN 101388823 A 3/2009
CN 101577657 A 11/2009
(Continued)

OTHER PUBLICATIONS

E. Rosen et al., "BGP/MPLS IP Virtual private networks (VPNS)," Network Working Group, Request for Comments: 4364, Obsoletes: 2547, Category: Standards Track, RFC4364, pp. 1-47, The Internet Society, (Feb. 2006).
(Continued)

*Primary Examiner* — Kwang B Yao
*Assistant Examiner* — Syed M Bokhari
(74) *Attorney, Agent, or Firm* — Leydig, Voit & Mayer, Ltd.

(57) ABSTRACT

Embodiments of the present invention provide a Multiprotocol Label Switching traffic engineering tunnel establishing method and device. A tunnel establishing method includes: receiving, by a second routing device, an identifier, which is sent by a first routing device, of an MPLS TE tunnel from a first VPN instance to a second VPN instance; acquiring, by the second routing device according to the identifier, path information of the MPLS TE tunnel from the first VPN instance to the second VPN instance; and establishing an MPLS TE tunnel from the second VPN instance to the first
(Continued)

VPN instance according to the acquired path information. Therefore, forward and reverse bidirectional tunnels are co-routed or partially co-routed, thereby solving a problem caused by non-co-routing during BFD.

26 Claims, 7 Drawing Sheets

Related U.S. Application Data continuation of application No. PCT/CN2013/076820, filed on Jun. 5, 2013.

(51) Int. Cl.
*H04L 12/721* (2013.01)
*H04L 12/751* (2013.01)
*H04L 12/911* (2013.01)

(52) U.S. Cl.
CPC ............ *H04L 45/36* (2013.01); *H04L 47/825* (2013.01); *H04L 47/828* (2013.01)

(58) Field of Classification Search
USPC ......................................... 370/217, 254, 392
See application file for complete search history.

(56) References Cited

U.S. PATENT DOCUMENTS

| | | |
|---|---|---|
| 2004/0174887 A1 | 9/2004 | Lee |
| 2006/0168279 A1 | 7/2006 | Lee et al. |
| 2007/0121524 A1 | 5/2007 | Rangarajan et al. |
| 2008/0080535 A1 | 4/2008 | Li et al. |
| 2008/0101385 A1 | 5/2008 | Elias et al. |
| 2008/0172497 A1 | 7/2008 | Mohan et al. |
| 2009/0323698 A1 | 12/2009 | Le Faucheur et al. |
| 2010/0246545 A1 | 9/2010 | Berzin |
| 2010/0284305 A1 | 11/2010 | Papp et al. |
| 2010/0284308 A1* | 11/2010 | Lv .................... H04L 12/4641 370/254 |
| 2010/0284409 A1 | 11/2010 | Lv |
| 2011/0013637 A1 | 1/2011 | Xue et al. |
| 2012/0008622 A1 | 1/2012 | Cao et al. |
| 2012/0008630 A1* | 1/2012 | Ould-Brahim ...... H04L 12/4625 370/392 |
| 2013/0003740 A1 | 1/2013 | Zheng |
| 2013/0155845 A1 | 6/2013 | Patel et al. |
| 2013/0329726 A1 | 12/2013 | Li et al. |
| 2014/0198797 A1 | 7/2014 | Cao et al. |
| 2014/0219135 A1 | 8/2014 | Li et al. |
| 2015/0085638 A1 | 3/2015 | Li |
| 2015/0092780 A1 | 4/2015 | Li |

FOREIGN PATENT DOCUMENTS

| | | |
|---|---|---|
| CN | 101631072 A | 1/2010 |
| CN | 102148738 A | 8/2011 |
| CN | 102281533 A | 12/2011 |
| CN | 102377630 A | 3/2012 |
| CN | 102724117 A | 10/2012 |
| CN | 102724118 A | 10/2012 |
| EP | 2429135 A1 | 3/2012 |
| EP | 2434697 A1 | 3/2012 |

OTHER PUBLICATIONS

Chen et al., "LDP extensions for Explicit Pseudowire to transport LSP mapping; draft-cao-pwe3-mpls-tp-pw-over-bidir-lsp-02.txt," Network working group, Internet Draft, Category: Standards Track, pp. 1-10, IETF Trust, (Mar. 14, 2011).

"Overview of 3GPP Release 4 V1.1.2," 3GPP Release 4 V1.1.2, pp. 1-50, 3rd Generation Partnership Project, Valbonne, France (Feb. 2010).

Awduche et al., "RSVP-TE Extensions to RSVP for LSP Tunnels," Network Working Group, Request for Comments: 3209, Category: Standards Track, RFC3209, XP15008988A, pp. 1-62, The Internet Society, (Dec. 2001).

Aggarwal et al., "Extensions to Resource Reservation Protocol—Traffic Engineering (RSVP-TE) for Point-to-Multipoint TE Label Switched Paths (LSPs)," Network Working Group Request for Comments: 4875, Category: Standards Track, XP15052419A, RFC4875, pp. 1-53,The IETF Trust (May 2007).

Frost et al, "MPLS Transport Profile Data Plane Architecture," Internet Engineering Task Force, Request for Comments: 5960, Category: Standards Track, RFC5960, XP015070920, pp. 1-15, IETF, (Aug. 2010).

U.S. Appl. No. 14/561,350, filed Dec. 5, 2014.

* cited by examiner

MULTIPROTOCOL LABEL SWITCHING TRAFFIC ENGINEERING TUNNEL ESTABLISHING METHOD AND DEVICE

CROSS-REFERENCE TO RELATED APPLICATION

This application is a continuation of U.S. patent application Ser. No. 14/561,350, filed on Dec. 5, 2014, which is a continuation of International Application No. PCT/CN2013/076820, filed on Jun. 5, 2013. The International Application claims priority to Chinese Patent Application No. 201210184022.9, filed on Jun. 6, 2012. All of the aforementioned patent applications are hereby incorporated by reference in their entireties.

TECHNICAL FIELD

Embodiments of the present invention relate to communications technologies, and in particular, to a Multiprotocol Label Switching traffic engineering tunnel establishing method and device.

BACKGROUND

A 3G network architecture defined by the 3rd Generation Partnership Project (3GPP for short) in the Wideband Code Division Multiple Access (WCDMA for short) R4 standard mainly includes: a radio access network (RAN for short), a core network (Core Network), and a bearer network (Backbone). A generalized RAN includes an air interface (Air Interface) between a terminal and a base station, that is, a Uu interface, and an Iub interface between the base station and a base station controller. For transmission and bearing, the RAN generally refers to an aggregation network between a base station and a base station controller.

With the development of a mobile network from 2G, to 3G, and then to a Long Term Evolution (LTE for short) technology, a mobile communications network is evolving in a direction of broadband, packet, and flatting, and a mobile all (ALL IP) Internet Protocol IP for short) network becomes an irreversible trend. The RAN is also faced with a trend of transforming from a conventional time division multiplexing (TDM for short)/asynchronous transfer mode (ATM for short) RAN to an IP RAN. The IP RAN based on an IP/Multiprotocol Label Switching (MPLS for short) packet data technology has a higher bandwidth, supports statistical multiplexing of a data service, can better support a future broadband mobile service, adopts a same technology as an IP backbone network, and has better consistency and integration with the backbone network; therefore, the IP RAN is widely used. The IP RAN mainly includes: an access ring at a base station side formed by ATN devices or other types of devices, and an aggregation ring formed by CX devices or other types of devices. Generally, each device on the aggregation ring may access 10 to 20 access rings. Each access ring is formed by about 10 ATN devices and the like. Two high-end CX devices or other types of devices are generally disposed in the aggregation ring as gateways which are connected to a core network. An ATN device or another type of device on the access ring is called a cell site gateway (CSG for short) or a multi-service transport gateway (MSTG for short). A CX device or another type of device on the aggregation ring is called a radio network controller site gateway (RSG for short) or a multi-service aggregation gateway (MSAG for short). A device that is on the access ring and the aggregation ring at the same time is a core router (Provider Router) in an MPLS virtual private network (VPN for short), that is, a P device; other devices on the access ring or the aggregation ring are provider edges (PE for short) in the MPLS VPN.

In IP RAN solutions, according to different service types, an end-to-end pseudo wire (PW for short) or a Layer 3 VPN (L3VPN for short) may be deployed between a PE (that is, CSG) on the access ring and a PE (that is, RSG) on the aggregation ring to carry a service. An L3VPN and a PW generally use an MPLS traffic engineering (TE for short) tunnel to traverse a network.

In an IP RAN network, when a service uses an MPLS TE tunnel, in order to ensure high reliability of the network, Bidirectional Forwarding Detection (BFD for short) needs to be used to detect an MPLS TE label switched path (LSP for short). When BFD detects that a network link or node encounters a fault, switching a service path may be triggered at an ingress node, so as to achieve an objective of protecting the service. However, because an MPLS TE LSP is unidirectional, a BFD forward detection message is sent through the MPLS TE LSP, but a reverse detection message is sent through another path, such as an IP path. In this way, when a reverse path is blocked, a BFD status is set to down (down), but actually a path status of a forward MPLS TE LSP is normal, so that an objective of ensuring high reliability of a service cannot be achieved.

SUMMARY

Embodiments of the present invention provide a Multiprotocol Label Switching traffic engineering tunnel establishing method and device, so as to solve a problem that forward and reverse bidirectional MPLS TE tunnels are not co-routed.

According to one aspect, an embodiment of the present invention provides a Multiprotocol Label Switching traffic engineering tunnel establishing method, including:

receiving, by a second routing device, a first identifier sent by a first routing device, where the first identifier is an identifier of a first MPLS TE tunnel, and the first MPLS TE tunnel is an MPLS TE tunnel from a first virtual private network VPN instance on the first routing device to a second VPN instance on the second routing device;

acquiring, by the second routing device, first path information according to the first identifier, where the first path information is path information of the first MPLS TE tunnel; and reversing, by the second routing device, the first path information to acquire second path information, and establishing a second MPLS TE tunnel according to the second path information, where the second MPLS TE tunnel is an MPLS TE tunnel from the second VPN instance to the first VPN instance.

Optionally, a service between the first VPN instance and the second VPN instance is a Layer 3 virtual private network L3VPN service; and the receiving, by a second routing device, a first identifier sent by a first routing device includes:

receiving, by the second routing device, a first Border Gateway Protocol BGP update message sent by the first routing device, where the first BGP update message includes a first VPN instance identifier and a first route target RT, the first VPN instance identifier is used to identify the first VPN instance, and the first RT is an RT of the first VPN instance;

sending, by the second routing device, a second BGP update message to the first routing device after determining that the first RT is equal to a second RT, where the second BGP update message includes a second VPN instance identifier and the second RT, where the second RT is an RT of the second VPN instance, and the second VPN instance identifier is used to identify the second VPN instance; and receiving, by the second routing device, a third BGP update message sent by the first routing device, where the third BGP update message includes the first identifier, and the third BGP update message is sent after the first routing device receives the second BGP update message.

Optionally, the third BGP update message further includes: the first VPN instance identifier, the first RT, and the second VPN instance identifier.

Optionally, the receiving, by the second routing device, a first BGP update message sent by the first routing device includes:

receiving, by the second routing device, the first BGP update message, parsing the first BGP update message, acquiring the first RT from attribute information in the first BGP update message, and acquiring the first VPN instance identifier from a network layer reachability information NLRI object in the first BGP update message; or, receiving, by the second routing device, the first BGP update message, parsing the first BGP update message, and acquiring the first VPN instance identifier and the first RT from a network layer reachability information NLRI object in the first BGP update message; and the sending, by the second routing device, a second BGP update message to the first routing device includes:

encapsulating, by the second routing device, the second RT in attribute information in the second BGP update message, encapsulating the second VPN instance identifier in an NLRI object in the second BGP update message, and then sending to the first routing device the second BGP update message in which the second RT and the second VPN instance identifier are encapsulated; or, encapsulating, by the second routing device, the second RT and the second VPN instance identifier in an NLRI object in the second BGP update message, and then sending to the first routing device the second BGP update message in which the second RT and the second VPN instance identifier are encapsulated.

Optionally, the first VPN instance identifier includes a first route distinguisher RD and a first Internet Protocol IP address, where the first RD is an RD of the first VPN instance, and the first IP address is an IP address of the first routing device; and the second VPN instance identifier includes a second RD and a second IP address, where the second RD is an RD of the second VPN instance, and the second IP address is an IP address of the second routing device.

Optionally, a service between the first VPN instance and the second VPN instance is a Layer 2 virtual private network L2VPN service; and the receiving, by a second routing device, a first identifier sent by a first routing device includes:

receiving, by the second routing device, a Label Distribution Protocol LDP label distribution message or a fourth Border Gateway Protocol BGP update message sent by the first routing device, where the LDP label distribution message or the fourth BGP update message includes the first identifier.

Optionally, the acquiring, by the second routing device, the first path information according to the first identifier includes:

determining, by the second routing device according to the first identifier and a first correspondence, the first MPLS TE tunnel identified by the first identifier, where the first correspondence is a correspondence between the first identifier and the first MPLS TE tunnel; and querying, by the second routing device, a second correspondence according to the identifier of the first MPLS TE tunnel, to acquire the first path information, where the second correspondence is a correspondence between the identifier of the first MPLS TE tunnel and the first path information;

or, the acquiring, by the second routing device, the first path information according to the first identifier includes:

querying, by the second routing device, a correspondence between the first identifier and the first path information according to the first identifier, to acquire the first path information, where the correspondence between the first identifier and the first path information is acquired by the second routing device from a received path message that is used to establish the first MPLS TE tunnel.

Optionally, the establishing, by the second routing device, a second MPLS TE tunnel according to the second path information specifically includes:

directly using, by the second routing device, the second path information to establish the second MPLS TE tunnel;

or, determining, by the second routing device, whether a link and/or node in the second path information meets a constraint of first tunnel attribute information; and if the second routing device determines that the link and/or node in the second path information meets the constraint of the first tunnel attribute information, using the second path information to establish the second MPLS TE tunnel, where the first tunnel attribute information is attribute information that is required for establishing the first MPLS TE tunnel by the first routing device, or, the first tunnel attribute information is attribute information that is preconfigured by the second routing device and required for establishing the second MPLS TE tunnel, or, the first tunnel attribute information is default attribute information that is required for establishing the second MPLS TE tunnel by the second routing device.

Optionally, the method further includes:

if the second routing device determines that the link and/or node in the second path information does not meet the constraint of the first tunnel attribute information, calculating third path information according to the first tunnel attribute information; and using, by the second routing device, the third path information to establish a third MPLS TE tunnel from the second VPN instance to the first VPN instance.

Optionally, before the establishing, by the second routing device, a second MPLS TE tunnel according to the second path information, the method further includes:

receiving, by the second routing device, tunnel establishing policy instruction information sent by the first routing device, where the tunnel establishing policy instruction information is used to instruct the second routing device to directly use the second path information to establish the second MPLS TE tunnel, or, the tunnel establishing policy instruction information is used to instruct, when the link and/or node in the second path information meets the constraint of the first tunnel attribute information, the second routing device to use the second path information to establish the second MPLS TE tunnel, or, the tunnel establishing policy instruction information is used to instruct, when the link and/or node in the second path information does not meet the constraint of the first tunnel attribute information, the second routing device to use the third path information calculated according to the first tunnel attribute information, to establish the third MPLS TE tunnel.

Optionally, the first MPLS TE tunnel includes a primary label switched path LSP and a backup LSP;

the acquiring, by the second routing device, first path information according to the first identifier includes:

respectively acquiring, by the second routing device according to role information of LSPs in the first MPLS TE tunnel, first primary path information corresponding to the primary LSP in the first MPLS TE tunnel and first backup path information corresponding to the backup LSP in the first MPLS TE tunnel; and the reversing, by the second routing device, the first path information to acquire second path information, and establishing a second MPLS TE tunnel according to the second path information includes:

respectively reversing, by the second routing device, the first primary path information and the first backup path information, to acquire second primary path information corresponding to the primary LSP in the first MPLS TE tunnel and second backup path information corresponding to the backup LSP in the first MPLS TE tunnel; and respectively establishing, by the second routing device, a primary LSP and a backup LSP in the second MPLS TE tunnel according to the second primary path information and the second backup path information.

Optionally, preconfiguring, for the second routing device, the attribute information that is required for establishing the second MPLS TE tunnel includes:

preconfiguring, for the second routing device, a tunnel template that is used to establish the second MPLS TE tunnel, and using the tunnel template to configure, for the second routing device, the attribute information that is required for establishing the second MPLS TE tunnel.

Optionally, the method further includes:

sending, by the second routing device, a fifth BGP update message to the first routing device, where the fifth BGP update message includes the first VPN instance identifier, the second VPN instance identifier, the second RT, and a second identifier, and the second identifier is an identifier of the second MPLS TE tunnel.

Optionally, the first VPN instance is a service active role of the service between the first VPN instance and the second VPN instance, and the second VPN instance is a service passive role of the service between the first VPN instance and the second VPN instance.

According to one aspect, an embodiment of the present invention provides a second routing device, including:

a first identifier receiving unit, configured to receive a first identifier sent by a first routing device, where the first identifier is an identifier of a first Multiprotocol Label Switching traffic engineering MPLS TE tunnel, and the first MPLS TE tunnel is an MPLS TE tunnel from a first virtual private network VPN instance on the first routing device to a second VPN instance on the routing device;

a first path information acquiring unit, configured to acquire first path information according to the first identifier, where the first path information is path information of the first MPLS TE tunnel; and a first tunnel establishing unit, configured to reverse the first path information to acquire second path information, and establish a second MPLS TE tunnel according to the second path information, where the second MPLS TE tunnel is an MPLS TE tunnel from the second VPN instance to the first VPN instance.

Optionally, a service between the first VPN instance and the second VPN instance is a Layer 3 virtual private network L3VPN service; and the second routing device further includes:

a first message receiving unit (74), configured to receive a first Border Gateway Protocol BGP update message sent by the first routing device, where the first BGP update message includes a first VPN instance identifier and a first route target RT, the first VPN instance identifier is used to identify the first VPN instance, and the first RT is an RT of the first VPN instance; and a first message sending unit (76), configured to send a second BGP update message to the first routing device after determining that the first RT is equal to a second RT, where the second BGP update message includes a second VPN instance identifier and the second RT, the second RT is an RT of the second VPN instance, and the second VPN instance identifier is used to identify the second VPN instance; and the first identifier receiving unit (71) is specifically configured to receive a third BGP update message sent by the first routing device, where the third BGP update message includes the first identifier, and the third BGP update message is sent after the first routing device receives the second BGP update message.

Optionally, the third BGP update message further includes: the first VPN instance identifier, the first RT, and the second VPN instance identifier.

Optionally, the first message receiving unit (74) is specifically configured to receive the first BGP update message, parse the first BGP update message, acquire the first RT from attribute information in the first BGP update message, and acquire the first VPN instance identifier from a network layer reachability information NLRI object in the first BGP update message; or is specifically configured to receive the first BGP update message, parse the first BGP update message, and acquire the first VPN instance identifier and the first RT from an NLRI object in the first BGP update message; and the first message sending unit (76) is specifically configured to encapsulate the second RT in attribute information in the second BGP update message, encapsulate the second VPN instance identifier in an NLRI object in the second BGP update message, and then send to the first routing device the second BGP update message in which the second RT and the second VPN instance identifier are encapsulated; or is specifically configured to encapsulate the second RT and the second VPN instance identifier in an NLRI object in the second BGP update message, and then send to the first routing device the second BGP update message in which the second RT and the second VPN instance identifier are encapsulated.

Optionally, the first VPN instance identifier includes a first route distinguisher RD and a first Internet Protocol IP address, where the first RD is an RD of the first VPN instance, and the first IP address is an IP address of the first routing device; and the second VPN instance identifier includes a second RD and a second IP address, where the second RD is an RD of the second VPN instance, and the second IP address is an IP address of the second routing device.

Optionally, a service between the first VPN instance and the second VPN instance is a Layer 2 virtual private network L2VPN service; and the first identifier receiving unit (71) is specifically configured to receive a Label Distribution Protocol LDP label distribution message or a fourth Border Gateway Protocol BGP update message sent by the first routing device, where the LDP label distribution message or the fourth BGP update message includes the first identifier.

Optionally, the first path information acquiring unit (72) is specifically configured to determine, according to the first identifier and a first correspondence, the first MPLS TE tunnel identified by the first identifier, and query a second correspondence according to the identifier of the first MPLS TE tunnel, to acquire the first path information, where the first correspondence is a correspondence between the first identifier and the first MPLS TE tunnel, and the second correspondence is a correspondence between the identifier of the first MPLS TE tunnel and the first path information; or, the first path information acquiring unit (72) is specifically configured to query a correspondence between the first identifier and the first path information according to the first identifier, to acquire the first path information, where the correspondence between the first identifier and the first path information is acquired by the second routing device from a received path message that is used to establish the first MPLS TE tunnel.

Optionally, the first tunnel establishing unit (73) is specifically configured to directly use the second path information to establish the second MPLS TE tunnel, or, is specifically configured to determine whether a link and/or node in the second path information meets a constraint of first tunnel attribute information, and after determining that the link and/or node in the second path information meets the constraint of the first tunnel attribute information, use the second path information to establish the second MPLS TE tunnel, where the first tunnel attribute information is attribute information that is required for establishing the first MPLS TE tunnel by the first routing device, or, the first tunnel attribute information is attribute information that is preconfigured by the second routing device and required for establishing the second MPLS TE tunnel, or, the first tunnel attribute information is default attribute information that is required for establishing the second MPLS TE tunnel by the second routing device.

Optionally, the first tunnel establishing unit (73) is further specifically configured to: after determining that the link and/or node in the second path information does not meet the constraint of the first tunnel attribute information, calculate third path information according to the first tunnel attribute information, and use the third path information to establish a third MPLS TE tunnel from the second VPN instance to the first VPN instance.

Optionally, the second routing device further includes:
a second message receiving unit (78), configured to receive tunnel establishing policy instruction information sent by the first routing device, where the tunnel establishing policy instruction information is used to instruct the second routing device to directly use the second path information to establish the second MPLS TE tunnel, or, the tunnel establishing policy instruction information is used to instruct, when the link and/or node in the second path information meets the constraint of the first tunnel attribute information, the second routing device to use the second path information to establish the second MPLS TE tunnel, or, the tunnel establishing policy instruction information is used to instruct, when the link and/or node in the second path information does not meet the constraint of the first tunnel attribute information, the second routing device to use the third path information calculated according to the first tunnel attribute information, to establish the third MPLS TE tunnel.

Optionally, the first MPLS TE tunnel includes a primary label switched path LSP and a backup LSP;

the first path information acquiring unit (72) is specifically configured to respectively acquire, according to role information of LSPs in the first MPLS TE tunnel, first primary path information corresponding to the primary LSP in the first MPLS TE tunnel and first backup path information corresponding to the backup LSP in the first MPLS TE tunnel; and the first tunnel establishing unit (73) is specifically configured to respectively reverse the first primary path information and the first backup path information, to acquire second primary path information corresponding to the primary LSP in the first MPLS TE tunnel and second backup path information corresponding to the backup LSP in the first MPLS TE tunnel, and then respectively establish a primary LSP and a backup LSP in the second MPLS TE tunnel according to the second primary path information and the second backup path information.

Optionally, the second router further includes:
a configuring unit (75), configured to use a preconfigured tunnel template that is used to establish the second MPLS TE tunnel, to configure the attribute information that is required for establishing the second MPLS TE tunnel.

Optionally, the second router further includes:
a first identifier sending unit (79), configured to send a fifth BGP update message to the first routing device, where the fifth BGP update message includes the first VPN instance identifier, the second VPN instance identifier, the second RT, and a second identifier, and the second identifier is an identifier of the second MPLS TE tunnel.

Optionally, the first VPN instance is a service active role of the service between the first VPN instance and the second VPN instance, and the second VPN instance is a service passive role of the service between the first VPN instance and the second VPN instance.

According to another aspect, an embodiment of the present invention provides a method for establishing an MPLS TE tunnel, including:

sending, by a first routing device, a first identifier to a second routing device, so that the second routing device acquires first path information according to the first identifier, where the first identifier is an identifier of a first Multiprotocol Label Switching traffic engineering MPLS TE tunnel, the first path information is path information of the first MPLS TE tunnel, and the first MPLS TE tunnel is an MPLS TE tunnel from a first virtual private network VPN instance on the first routing device to a second VPN instance on the second routing device;

receiving, by the first routing device, a path message that is sent by the second routing device and is used to establish a second MPLS TE tunnel, where the second MPLS TE tunnel is an MPLS TE tunnel from the second VPN instance to the first VPN instance, and path information of the second MPLS TE tunnel is obtained by reversing the first path information; and sending, by the first routing device, to the second routing device a reserved message corresponding to the path message.

Optionally, a service between the first VPN instance and the second VPN instance is a Layer 3 virtual private network L3VPN service; and the sending, by a first routing device, a first identifier to a second routing device includes:

sending, by the first routing device, a first BGP update message to the second routing device, where the first BGP update message includes a first VPN instance identifier and a first route target RT, the first VPN instance identifier is used to identify the first VPN instance, and the first RT is an RT of the first VPN instance;

receiving, by the first routing device, a second BGP update message sent by the second routing device, where the second BGP update message includes a second VPN instance identifier and a second RT, where the second VPN instance identifier is used to identify the second VPN instance, the second RT is an RT of the second VPN instance, and the second BGP update message is sent after the second routing device determines that the first RT is equal to the second RT;

after it is determined that the first RT is equal to the second RT, determining, by the first routing device, the first identifier according to the first VPN instance identifier and the second VPN instance identifier; and sending, by the first routing device, a third BGP update message to the second routing device, where the third BGP update message includes the first identifier.

Optionally, the third BGP update message further includes: the first VPN instance identifier, the first RT, and the second VPN instance identifier.

Optionally, the sending, by the first routing device, a first BGP update message to the second routing device includes:

encapsulating, by the first routing device, the first RT in attribute information in the first BGP update message, encapsulating the first VPN instance identifier in a network layer reachability information NLRI object in the first BGP update message, and then sending to the second routing device the first BGP update message in which the first RT and the first VPN instance identifier are encapsulated; or, encapsulating, by the first routing device, the first RT and the first VPN instance identifier in an NLRI object in the first BGP update message, and then sending to the second routing device the first BGP update message in which the first RT and the first VPN instance identifier are encapsulated; and the receiving, by the first routing device, a second BGP update message sent by the second routing device includes:

receiving, by the first routing device, the second BGP update message, parsing the second BGP update message, acquiring the second RT from attribute information in the second BGP update message, and acquiring the second VPN instance identifier from an NLRI object in the second BGP update message; or, receiving, by the first routing device, the second BGP update message, parsing the second BGP update message, and acquiring the second VPN instance identifier and the second RT from an NLRI object in the second BGP update message.

Optionally, the first VPN instance identifier includes a first route distinguisher RD and a first Internet Protocol IP address, where the first RD is an RD of the first VPN instance, and the first IP address is an IP address of the first routing device; and the second VPN instance identifier includes a second RD and a second IP address, where the second RD is an RD of the second VPN instance, and the second IP address is an IP address of the second routing device.

Optionally, a service between the first VPN instance and the second VPN instance is a Layer 2 virtual private network L2VPN service; and the sending, by a first routing device, a first identifier to a second routing device includes:

sending, by the first routing device, a Label Distribution Protocol LDP label distribution message or a fourth Border Gateway Protocol BGP update message to the second routing device, where the LDP label distribution message or the fourth BGP update message includes the first identifier.

Optionally, the method further includes:

sending, by the first routing device, tunnel establishing policy instruction information, where the tunnel establishing policy instruction information is used to instruct the second routing device to directly use second path information to establish the second MPLS TE tunnel, or, the tunnel establishing policy instruction information is used to instruct, when a link and/or node in the second path information meets a constraint of first tunnel attribute information, the second routing device to use the second path information to establish the second MPLS TE tunnel, or, the tunnel establishing policy instruction information is used to instruct, when the link and/or node in the second path information does not meet the constraint of the first tunnel attribute information, the second routing device to use third path information calculated according to the first tunnel attribute information, to establish a third MPLS TE tunnel.

Optionally, the first VPN instance is a service active role of the service between the first VPN instance and the second VPN instance, and the second VPN instance is a service passive role of the service between the first VPN instance and the second VPN instance.

Optionally, the method further includes:

sending, by the first routing device, to the second routing device a path message that is used to establish the first MPLS TE tunnel, where the path message carries a correspondence between the first identifier and the first path information.

According to another aspect, an embodiment of the present invention provides a first routing device, including:

a second identifier sending unit (90), configured to send a first identifier to a second routing device, so that the second routing device acquires first path information according to the first identifier, where the first identifier is an identifier of a first Multiprotocol Label Switching traffic engineering MPLS TE tunnel, the first path information is path information of the first MPLS TE tunnel, and the first MPLS TE tunnel is an MPLS TE tunnel from a first virtual private network VPN instance on the first routing device to a second VPN instance on the second routing device;

a path message receiving unit (91), configured to receive a path message that is sent by the second routing device and is used to establish a second MPLS TE tunnel, where the second MPLS TE tunnel is an MPLS TE tunnel from the second VPN instance to the first VPN instance, and path information of the second MPLS TE tunnel is obtained by reversing the first path information; and a reserved message sending unit (92), configured to send to the second routing device a reserved message corresponding to the path message.

Optionally, a service between the first VPN instance and the second VPN instance is a Layer 3 virtual private network L3VPN service; and the first routing device further includes:

a second message sending unit (93), configured to send a first Border Gateway Protocol BGP update message to the second routing device, where the first BGP update message includes a first VPN instance identifier and a first route target RT, the first VPN instance identifier is used to identify the first VPN instance, and the first RT is an RT of the first VPN instance;

a third message receiving unit (94), configured to receive a second BGP update message sent by the second routing device, where the second BGP update message includes a second VPN instance identifier and a second RT, where the second VPN instance identifier is used to identify the second VPN instance, the second RT is an RT of the second VPN instance, and the second BGP update message is sent after the second routing device determines that the first RT is equal to the second RT; and a first tunnel information determining unit (96), configured to: after it is determined that the first RT is equal to the second RT, determine the first identifier according to the first VPN instance identifier and the second VPN instance identifier; and the second identifier sending unit (90) is specifically configured to send a third BGP update message to the second routing device, where the third BGP update message includes the first identifier.

Optionally, the third BGP update message further includes: the first VPN instance identifier, the first RT, and the second VPN instance identifier.

Optionally, the second message sending unit (93) is specifically configured to encapsulate the first RT in attribute information in the first BGP update message, encapsulate the first VPN instance identifier in a network layer reachability information NLRI object in the first BGP update message, and then send to the second routing device the first BGP update message in which the first RT and the first VPN instance identifier are encapsulated; or is specifically configured to encapsulate the first RT and the first VPN instance identifier in an NLRI object in the first BGP update message, and then send to the second routing device the first BGP update message in which the first RT and the first VPN instance identifier are encapsulated; and the third message receiving unit (94) is specifically configured to receive the second BGP update message, parse the second BGP update message, acquire the second RT from attribute information in the second BGP update message, and acquire the second VPN instance identifier from an NLRI object in the second BGP update message; or is specifically configured to receive the second BGP update message, parse the second BGP update message, and acquire the second VPN instance identifier and the second RT from an NLRI object in the second BGP update message.

Optionally, the first VPN instance identifier includes a first route distinguisher RD and a first Internet Protocol IP address, where the first RD is an RD of the first VPN instance, and the first IP address is an IP address of the first routing device; and the second VPN instance identifier includes a second RD and a second IP address, where the second RD is an RD of the second VPN instance, and the second IP address is an IP address of the second routing device.

Optionally, a service between the first VPN instance and the second VPN instance is a Layer 2 virtual private network L2VPN service; and the second identifier sending unit (90) is specifically configured to send a Label Distribution Protocol LDP label distribution message or a fourth Border Gateway Protocol BGP update message to the second routing device, where the LDP label distribution message or the fourth BGP update message includes the first identifier.

Optionally, the first VPN instance is a service active role of the service between the first VPN instance and the second VPN instance, and the second VPN instance is a service passive role of the service between the first VPN instance and the second VPN instance.

Optionally, the first routing device further includes:

a third message sending unit (98), configured to send tunnel establishing policy instruction information, where the tunnel establishing policy instruction information is used to instruct the second routing device to directly use second path information to establish the second MPLS TE tunnel, or, the tunnel establishing policy instruction information is used to instruct, when a link and/or node in the second path information meets a constraint of first tunnel attribute information, the second routing device to use the second path information to establish the second MPLS TE tunnel, or, the tunnel establishing policy instruction information is used to instruct, when the link and/or node in the second path information does not meet the constraint of the first tunnel attribute information, the second routing device to use third path information calculated according to the first tunnel attribute information, to establish a third MPLS TE tunnel.

In the embodiments, a first routing device announces to a second routing device an identifier of a first MPLS TE tunnel from a first VPN instance on the first routing device to a second VPN instance on the second routing device, the second routing device acquires path information of the first MPLS TE tunnel from the first VPN instance to the second VPN instance according to the identifier, and then if a network condition permits, establishes a second MPLS TE tunnel from the second VPN instance to the first VPN instance according to path information obtained after the path information is reversed, so that the first MPLS TE tunnel from the second VPN instance to the first VPN instance and the second MPLS TE tunnel from the first VPN instance to the second VPN instance are co-routed and in reverse directions, thereby solving or reducing multiple kinds of problems caused by non-co-routing during BFD.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
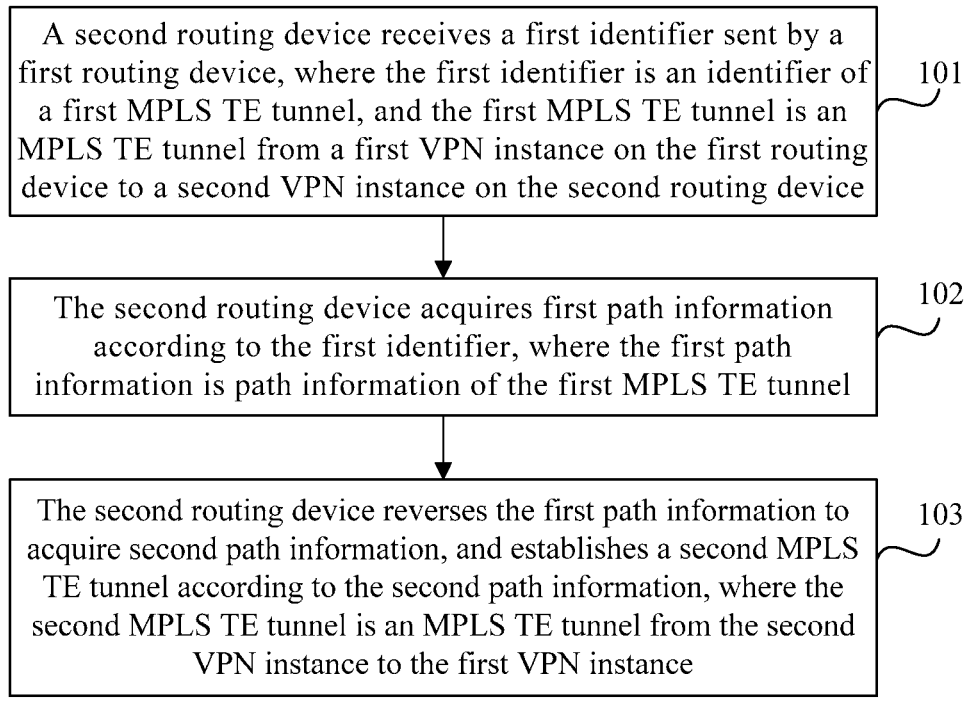
FIG. 1 is a flowchart of an MPLS TE tunnel establishing method according to an embodiment of the present invention.

FIG. 1 is a flowchart of an MPLS TE tunnel establishing method according to an embodiment of the present invention. As shown in FIG. 1, the method in this embodiment includes:

Step 101: A second routing device receives a first identifier sent by a first routing device, where the first identifier is an identifier of a first MPLS TE tunnel, and the first MPLS TE tunnel is an MPLS TE tunnel from a first VPN instance on the first routing device to a second VPN instance on the second routing device.

For a service between the first VPN instance on the first routing device and the second VPN instance on the second routing device, the first VPN instance and the second VPN instance may be classified into a service active role and a service passive role. Which end is the service active role and which end is the service passive role may be determined by configuration or by negotiation by using a protocol. If it is determined by configuration, a service role needs to be respectively configured for the first VPN instance and the second VPN instance in advance before step 101, where the configured service role is the service passive role or the service active role. In this embodiment, the first VPN instance on the first routing device is the service active role of the service between the first VPN instance and the second VPN instance; the second VPN instance on the second routing device is the service passive role of the service between the first VPN instance and the second VPN instance.

In this embodiment, after determining a used identifier of the MPLS TE tunnel from the first VPN instance to the second VPN instance, that is, the first identifier, the first routing device may notify the second routing device of the first identifier by using signaling. Because different MPLS TE tunnels have different identifiers, the second routing device can identify the first MPLS TE tunnel corresponding to the first identifier from multiple MPLS TE tunnels according to the first identifier. Optionally, the second routing device may also acquire path information of the first MPLS TE tunnel according to the first identifier. The path information of the first MPLS TE tunnel is first path information.

In addition, the first routing device may initiate establishment of the MPLS-TE tunnel from the first VPN instance to the second VPN instance on the second routing device, that is, the first MPLS-TE tunnel. Specifically, the first routing device may establish the first MPLS TE tunnel by using preconfigured attribute information that is required for establishing an MPLS TE tunnel. Further, the first routing device may also establish the first MPLS TE tunnel according to the preconfigured attribute information that is required for establishing an MPLS TE tunnel and according to a tunnel policy for establishing an MPLS TE tunnel by using the preconfigured attribute information that is required for establishing an MPLS TE tunnel. The tunnel policy refers to a policy for establishing an MPLS TE tunnel by using the preconfigured attribute information that is required for establishing an MPLS TE tunnel, where the policy may be a sharing mode or an exclusive mode. The sharing mode indicates that, when the first MPLS TE tunnel is to be established by using the preconfigured attribute information that is required for establishing an MPLS TE tunnel, if it is found that there is a corresponding MPLS TE tunnel between the first VPN instance and the second VPN instance, the first MPLS TE tunnel does not need to be established any more, and the existing MPLS TE tunnel is directly used. The exclusive mode indicates that, when the first MPLS TE tunnel is to be established by using the preconfigured attribute information that is required for establishing an MPLS TE tunnel, an existing MPLS TE tunnel between the first VPN instance and the second VPN instance is not considered, and an independent first MPLS TE tunnel needs to be established for the service between the first VPN instance and the second VPN instance.

In this embodiment, a process in which the first routing device determines a used first identifier and a process in which the first routing device sends the first identifier to the second routing device are independent of a process in which the first routing device establishes the first MPLS TE tunnel, of which sequence is not limited.

Further, after the first MPLS TE tunnel is established, the second routing device reversely establishes an MPLS TE tunnel from the second VPN instance on the second routing device to the first VPN instance on the first routing device. The MPLS TE tunnel from the second VPN instance on the second routing device to the first VPN instance on the first routing device is a second MPLS TE tunnel, where the second MPLS TE tunnel and the first MPLS TE tunnel are co-routed and in reverse directions.

Optionally, the service between the first VPN instance and the second VPN instance may be a Layer 3 VPN (Layer 3 VPN, L3VPN for short) service. In this case, the first routing device may use the Multiprotocol Border Gateway Protocol (multiprotocol-border gateway protocol, MP-BGP for short) to perform service negotiation with the second routing device, and use the RSVP-TE protocol to establish the first MPLS TE tunnel. Based on this, the first routing device may extend the MP-BGP protocol, and announces the first identifier to the second routing device by using the extended MP-BGP protocol.

In an existing L3VPN mechanism, a VPN route and a VPN local label are announced between the first routing device and the second routing device. There are multiple IP routes in one VPN instance, and a VPN route refers to an IP route in each VPN instance. It makes no sense to carry a tunnel identifier for a specified VPN route, because an identifier of an MPLS TE tunnel is associated with a service, and the service is corresponding to a VPN instance but not a VPN route. Based on this, a process of extending the MP-BGP and announcing a tunnel identifier includes a process of identifying VPN instances, but not VPN routes, of two service ends, and a process of announcing the tunnel identifier after identifying the VPN instances of the two service ends. In this embodiment, the process in which the first routing device sends the first identifier to the second routing device includes a process of identifying the first VPN instance on the first routing device and the second VPN instance on the second routing device, and a process of sending the first identifier after identifying the VPN instances.

Optionally, an implementation manner in which the second routing device receives the first identifier sent by the first routing device includes: receiving, by the second routing device, a first Border Gateway Protocol (Border Gateway Protocol, BGP for short) update message sent by the first routing device, where the first BGP update message includes a first VPN instance identifier and a first route target (Route Target, RT for short), the first VPN instance identifier is used to identify the first VPN instance on the first routing device, and the first RT is an RT of the first VPN instance. The first VPN instance identified by the first VPN instance identifier is actually a VPN instance that carries the foregoing L3VPN service on the first routing device.

In this embodiment, an RT of a VPN instance, for example, the RT of the first VPN instance, is mainly used by the first routing device and the second routing device to determine whether the VPN instances between them have a service peer relationship. That is, whether there is a service peer relationship between two VPN instances can be determined by using RTs of the two VPN instances. If an import (Import) RT of one VPN instance is equal to an export (Export) RT of another VPN instance, it indicates that there is a service peer relationship between the two VPN instances. In this embodiment, the RT of the first VPN instance is regarded as an import RT, and an RT of a VPN instance on the second routing device is regarded as an export RT. In this embodiment, a VPN instance that is on the second routing device and has a service peer relationship with the first VPN instance is the second VPN instance. After learning the first RT, the second routing device may compare the first RT and a second RT; if the first RT is equal to the second RT, it may be determined that there is a service peer relationship between the first VPN instance and the second VPN instance. The second RT is an RT of the second VPN instance, and the second VPN instance is identified by using a second VPN instance identifier.

Based on what is described above, after determining that the first RT is equal to the second RT, the second routing device sends a second BGP update message to the first routing device, where the second BGP update message includes the second VPN instance identifier and the second RT, and the second VPN instance identifier is used to identify the second VPN instance on the second routing device. Correspondingly, after it is determined that the first RT is equal to the second RT, the first routing device may also learn that the first MPLS TE tunnel needs to be established, and further determine the used first identifier.

In the foregoing process, the first routing device and the second routing device send to each other a BGP update message that carries a VPN instance identifier, so that the first VPN instance and the second VPN instance can learn from each other, thereby implementing the identifying of the first VPN instance and the second VPN instance.

After the first VPN instance and the second VPN instance are identified, the second routing device receives a third BGP update message sent by the first routing device, where the third BGP update message includes the first identifier. The third BGP update message is sent after the first routing device receives the second BGP update message. Correspondingly, the second routing device acquires the first identifier from the third BGP update message sent by the first routing device.

Optionally, besides the first identifier, the third BGP update message may further include such information as the first VPN instance identifier, the first RT, and the second VPN instance identifier.

In addition, after determining, according to the first VPN instance identifier and the second VPN instance identifier, that the first MPLS TE tunnel needs to be established between the first VPN instance and the second VPN instance, the first routing device may trigger, according to an IP address of the second routing device and attribute information that is required for establishing the first MPLS TE tunnel, a process of establishing the first MPLS TE tunnel. Specifically, the first routing device calculates the first path information by using the preconfigured attribute information that is required for establishing the first MPLS TE tunnel, and establishes the first MPLS TE tunnel according to the first path information by using the Resource Reservation Protocol-Traffic Engineering (Resource ReSerVation Protocol-Traffic Engineering, RSVP-TE for short). A process in which the first routing device sends the first identifier to the second routing device by using the third BGP update message is independent of the process in which the first routing device establishes the first MPLS TE tunnel, of which sequence is not limited by this embodiment of the present invention.

It should be noted that, for specific content of the first identifier in the embodiments of the present invention, reference may be made to a definition in the standard document RFC 3209, and other formats may also be used.

Optionally, the first routing device and the second routing device may use attribute information and network layer reachability information (Network Layer Reachability Information, NLRI for short) to carry an RT of a VPN instance and a VPN instance identifier, or use the NLRI to carry a VPN instance identifier and an RT of a VPN instance.

Based on what is described above, a process in which the second routing device receives the first BGP update message sent by the first routing device may be: receiving, by the second routing device, the first BGP update message sent by the first routing device, parsing the first BGP update message, acquiring the first RT from attribute information in the first BGP update message, and acquiring the first VPN instance identifier from an NLRI object in the first BGP update message. Alternatively, the process in which the second routing device receives the first BGP update message sent by the first routing device may be: receiving, by the second routing device, the first BGP update message sent by the first routing device, parsing the first BGP update message, and acquiring the first VPN instance identifier and the first RT from an NLRI object in the first BGP update message. Correspondingly, a process in which the second routing device sends the second BGP update message to the first routing device may be: encapsulating, by the second routing device, the second RT in attribute information in the second BGP update message, encapsulating the second VPN instance identifier in an NLRI object in the second BGP update message, and then sending to the first routing device the second BGP update message in which the second RT and the second VPN instance identifier are encapsulated. Alternatively, the process in which the second routing device sends the second BGP update message to the first routing device may be: encapsulating, by the second routing device, the second RT and the second VPN instance identifier in an NLRI object in the second BGP update message, and then sending to the first routing device the second BGP update message in which the second RT and the second VPN instance identifier are encapsulated.

Further, the VPN instance identifier in this embodiment may include a route distinguisher (Router Distinguisher, RD for short) and an IP address. The RD is used to distinguish different VPN instances on a same device. The first VPN instance identifier includes a first RD and a first IP address. The first RD is an RD of the first VPN instance, the first IP address is an IP address of the first routing device, and the first IP address identifies the first routing device but not an IP route of a VPN instance on the first routing device. Correspondingly, the second VPN instance identifier includes a second RD and a second IP address. The second RD is an RD of the second VPN instance, the second IP address is an IP address of the second routing device, and the second IP address identifies the second routing device but not an IP route of a VPN instance on the second routing device.

Further, the NRLI may further include next hop information. The next hop information refers next hop information of the first IP address or the second IP address.

Optionally, before a role as which the first VPN instance and the second VPN instance respectively act in the service between the first VPN instance and the second VPN instance is determined, the first routing device and the second routing device may compare values of the first VPN instance identifier and the second VPN instance identifier, and determine a role of the first VPN instance and a role of the second VPN instance according to a result of the comparing and a role determining rule. In this embodiment, the role determining rule may be set to: when the first VPN instance identifier is greater than the second VPN instance identifier, determining that the first VPN instance is the service active role and the second VPN instance is the service passive role; or the role determining rule may be set to: when the first VPN instance identifier is less than the second VPN instance identifier, determining that the first VPN instance is the service active role and the second VPN instance is the service passive role.

Optionally, besides the foregoing method for determining the service active role and the service passive role, the first routing device and the second routing device may further respectively determine, according to role information received from a management device in advance or role information preconfigured in the first routing device and the second routing device, the roles of the first VPN instance and the second VPN instance in the service between the first VPN instance and the second VPN instance.

Optionally, an MPLS TE tunnel may include multiple label switched paths (Label Switched Path, LSP for short). An identifier of each LSP may include an ingress (Ingress) router identifier (ID for short) (which may be called a local LSP ID) and an MPLS TE tunnel (Tunnel) ID (that is, an identifier of an MPLS TE tunnel). For different LSPs in a same MPLS TE tunnel, Tunnel IDs in identifiers of the LSPs are the same, but local LSP IDs are different.

Optionally, the first MPLS TE tunnel in this embodiment may include a primary LSP and a backup LSP. When establishing the primary LSP and the backup LSP, the first routing device carries role information of the LSPs, where the role information is used to indicate that an LSP corresponding to the role information is a primary LSP or a backup LSP.

Optionally, the service between the first VPN instance and the second VPN instance may be a Layer 2 VPN (Layer 2 VPN, L2VPN) service. In this case, the first routing device may use a dynamic protocol, for example, Label Distribution Protocol (Label Distributed Protocol, LDP for short) or the BGP, to perform service negotiation with the second routing device to establish an L2VPN PW, and use the RSVP-TE to establish the first MPLS TE tunnel. Based on this, the second routing device may receive an LDP label distribution message or a fourth BGP update message sent by the first routing device, to acquire the first identifier from the LDP label distribution message or fourth BGP update message. The first identifier may be carried in the LDP label or fourth BGP update message.

For example, a manner of extending the LDP or BGP and carrying the first identifier may be: adding a new field in the LDP label distribution message or fourth BGP update message, and carrying the first identifier by using the new field. Alternatively, the manner of extending the LDP or BGP and carrying the first identifier may be: redefining one or some existing fields in the LDP label distribution message or fourth BGP update message, and carrying the first identifier by using the redefined field or fields.

Step 102: The second routing device acquires first path information according to the first identifier, where the first path information is path information of the first MPLS TE tunnel.

In a process of establishing one MPLS TE tunnel, all nodes and links passed by the MPLS TE tunnel are recorded, and in this way, after the MPLS TE tunnel is established, information of a full path passed by the MPLS TE tunnel is obtained. Optionally, nodes and links passed by one MPLS TE tunnel may be recorded in a record route object (Record Route Object, RRO for short) in a path (path) message received by a tail-end node in the MPLS TE tunnel. In addition, an identifier of the MPLS TE tunnel is carried in a session (session) object in the path message. The path information of the first MPLS TE tunnel is called the first path information, and the first path information includes such information as nodes and links passed by the first MPLS TE tunnel.

In the process in which the first routing device establishes the first MPLS TE tunnel, the path information of the first MPLS TE tunnel, that is, the first path information, is carried in an RRO object in a path message that is received by the second routing device and is used to establish the first MPLS TE tunnel, and the identifier of the first MPLS TE tunnel, that is the first identifier, is carried in a session object in the path message. In this way, during the process of establishing the first MPLS TE tunnel, the second routing device acquires a correspondence between the first path information and the first identifier. After the second routing device acquires the first identifier, the second routing device may further determine the first path information according to the first identifier and the correspondence, which exists in the second routing device or is acquired from the path message after the first identifier is acquired, between the first path information and the first identifier. Optionally, in a manner of extending a protocol, the first identifier and/or the first path information may be carried in an extended field of the path message. A process in which the second routing device acquires the first path information according to the first identifier may further be: determining, by the second routing device according to the first identifier and a first correspondence, the first MPLS TE tunnel identified by the first identifier. The first correspondence is a correspondence between the first identifier and the first MPLS TE tunnel. Then the second routing device queries a second correspondence according to the identifier of the first MPLS TE tunnel, to acquire the first path information. The second correspondence is actually a correspondence between the identifier of the first MPLS TE tunnel and the first path information.

In addition, the first routing device may further send to the second routing device the attribute information that is required for establishing the first MPLS TE tunnel by the first routing device. That is, the second routing device may learn the attribute information that is required for establishing the first MPLS TE tunnel by the first routing device.

Optionally, if the first MPLS TE tunnel in this embodiment includes a primary LSP and a backup LSP, the process in which the second routing device acquires the first path information according to the first identifier includes: respectively acquiring, by the second routing device according to role information of LSPs in the first MPLS TE tunnel, first primary path information corresponding to the primary LSP and first backup path information corresponding to the backup LSP.

Step 103: The second routing device reverses the first path information to acquire second path information, and establishes a second MPLS TE tunnel according to the second path information, where the second MPLS TE tunnel is an MPLS TE tunnel from the second VPN instance to the first VPN instance.

After acquiring the first path information, the second routing device reverses the first path information to acquire the second path information. Nodes and links that are included in the first path information and the second path information are exactly the same, and a difference lies in that path directions are opposite. For example, assuming that the first path information is: node A→node B→node C, the second path information is: node C→node B→node A.

Then, the second routing device establishes the second MPLS TE tunnel according to the second path information, that is, the MPLS TE tunnel from the second VPN instance to the first VPN instance is established.

Optionally, the second routing device directly uses the second path information to establish the second MPLS TE tunnel. That is, the second routing device does not determine whether a link and/or node in the second path information meets a constraint of first tunnel attribute information, and directly establishes the second MPLS TE tunnel. If a network condition permits, this manner is practicable.

Optionally, before establishing the second MPLS TE tunnel, the second routing device may first determine whether a link and/or node in the second path information meets a constraint of first tunnel attribute information. After determining that the link and/or node in the second path information meets the constraint of the first tunnel attribute information, the second routing device uses the second path information to establish the second MPLS TE tunnel.

Optionally, if the second routing device determines that the link and/or node in the second path information does not meet the constraint of the first tunnel attribute information, the second routing device may calculate third path information according to the first tunnel attribute information, and then use the third path information to establish a third MPLS TE tunnel from the second VPN instance to the first VPN instance. Part of content in the third path information is the same as part of content in the second path information, that is, the third MPLS TE tunnel and the first MPLS TE tunnel are in reverse directions and partially co-routed.

Optionally, the second routing device may also directly use the second path information to establish the second MPLS TE tunnel in a case in which it is not determined whether a link and/or node in the second path information meets a constraint of first tunnel attribute information. If a network condition permits, the second MPLS TE tunnel can also be successfully established in this directly establishing manner.

The first tunnel attribute information may be attribute information that is required for establishing the first MPLS TE tunnel by the first routing device, or attribute information that is preconfigured by the second routing device and required for establishing the second MPLS TE tunnel, or default attribute information that is required for establishing the second MPLS TE tunnel by the second routing device.

It can be learned from the foregoing description that the second routing device in this embodiment can establish the second MPLS TE tunnel according to the first path information and the attribute information that is required for establishing the first MPLS TE tunnel by the first routing device; the second routing device does not need to configure, in local, a large amount of attribute information that is used to establish the second MPLS TE tunnel, which helps to reduce a workload of configuring attribute information. There are two possibilities of establishing the second MPLS TE tunnel, which are success and failure. A concept of success is that all the nodes and links in the second path information that is obtained by reversing the first path information meets a requirement of the attribute information that is required for establishing the first MPLS TE tunnel by the first routing device. In a case of a failure, the second routing device may return a tunnel establishing failure message to the first routing device, indicating that forward and reverse bidirectional co-routed tunnels cannot be established; or the second routing device may further calculate the third path information according to the attribute information that is required for establishing the first MPLS TE tunnel by the first routing device, and establish, based on the third path information, the third MPLS TE tunnel. Preferably, part of content in the third path information is the same as part of content in the second path information.

In addition, the second routing device in this embodiment may also establish the second MPLS TE tunnel according to the first path information and the attribute information that is preconfigured in local and required for establishing the second MPLS TE tunnel. The second routing device uses the attribute information configured in local, which can ensure flexibility of configuring the second MPLS TE tunnel. There are also two possibilities of establishing the second MPLS TE tunnel, which are success and failure. A concept of success is that all the nodes and links in the second path information that is obtained by reversing the first path information meets a requirement of the attribute information that is used by the second routing device; otherwise, it is a failure. In a case of a failure, the second routing device may return a tunnel establishing failure message to the first routing device, indicating that forward and reverse bidirectional co-routed tunnels cannot be established; or the second routing device may further calculate the third path information according to the attribute information that is used by the second routing device, configured in local, and required for establishing the second MPLS TE tunnel, and establish, based on the third path information, the third MPLS TE tunnel. Preferably, part of content in the third path information is the same as part of content in the second path information.

In addition, the second routing device in this embodiment may further establish the second MPLS TE tunnel according to the first path information and the default attribute information that is required for establishing the second MPLS TE tunnel. The default attribute information does need to be configured, which helps to reduce a workload of configuring attribute information. There are also two possibilities of establishing the second MPLS TE tunnel, which are success and failure. A concept of success is that all the nodes and links in the second path information that is obtained by reversing the first path information meets a requirement of the default attribute information; otherwise, it is a failure. In a case of a failure, the second routing device may return a tunnel establishing failure message to the first routing device, indicating that forward and reverse bidirectional co-routed tunnels cannot be established; or the second routing device may further calculate the third path information according to the default attribute information that is used and required for establishing the second MPLS TE tunnel, and establish, based on the third path information, the third MPLS TE tunnel. Preferably, part of content in the third path information is the same as part of content in the second path information.

Optionally, an implementation manner of calculating the third path information by using the attribute information that is required for establishing the first MPLS TE tunnel by the first routing device, or the attribute information that is configured by the second routing device in local and required for establishing the second MPLS TE tunnel, or the default attribute information that is required for establishing the second MPLS TE tunnel by the second routing device may be: calculating, by the second routing device, multiple kinds of possible path information by using the attribute information that is required for establishing the first MPLS TE tunnel by the first routing device, or the attribute information that is configured by the second routing device in local and required for establishing the second MPLS TE tunnel, or the default attribute information that is required for establishing the second MPLS TE tunnel by the second routing device; then comparing the calculated path information respectively with the first path information and the second path information; and acquiring path information that has more content which is the same as content of the first path information or the second path information as the third path information. According to the foregoing implementation manner, the MPLS TE tunnel from the second VPN instance to the first VPN instance and the MPLS TE tunnel from the first VPN instance to the second VPN instance are co-routed as much as possible.

Optionally, before the second routing device establishes the second MPLS TE tunnel according to the second path information, this embodiment further includes:

The second routing device receives tunnel establishing policy instruction information sent by the first routing device, where the tunnel establishing policy instruction information is used to instruct the second routing device to directly use the second path information to establish the second MPLS TE tunnel, or, is used to instruct, when the link and/or node in the second path information meets the constraint of the first tunnel attribute information, the second routing device to use the second path information to establish the second MPLS TE tunnel, or, the tunnel policy instruction information is used to instruct, when the link and/or node in the second path information does not meet the constraint of the first tunnel attribute information, the second routing device to use the third path information calculated according to the first tunnel attribute information, to establish the third MPLS TE tunnel. The directly using the second path information to establish the second MPLS TE tunnel means that, in a case in which it is not determined whether the link and/or node in the second path information meets the constraint of the first tunnel attribute information, the second path information is used to establish the second MPLS TE tunnel.

It should be noted that, in a case in which the second routing device does not receive the tunnel establishing policy instruction information sent by the first routing device, the second routing device may also actively establish the second MPLS TE tunnel according to the foregoing manners of establishing the second MPLS TE tunnel. That is, regardless of whether the second routing device receives the tunnel establishing policy instruction information sent by the first routing device, the second routing device can directly establish the second MPLS TE tunnel; or, the second routing device determines whether the link and/or node in the second path information meets the constraint of the first tunnel attribute information, and uses the second path information to establish the second MPLS TE tunnel after determining that the link and/or node in the second path information meets the constraint of the first tunnel attribute information, or calculates the third path information according to the first tunnel attribute information after determining that the link and/or node in the second path information does not meet the constraint of the first tunnel attribute information, and then uses the third path information to establish the third MPLS TE tunnel. The first tunnel attribute information is the attribute information that is required for establishing the first MPLS TE tunnel by the first routing device, or, the first tunnel attribute information is the attribute information that is preconfigured by the second routing device and required for establishing the second MPLS TE tunnel, or, the first tunnel attribute information is the default attribute information that is required for establishing the second MPLS TE tunnel by the second routing device.

Optionally, the preconfiguring, for the first routing device or second routing device, attribute information that is used to establish an MPLS TE tunnel may be: first configuring, for the first routing device or second routing device, a tunnel template that is used to establish the MPLS TE tunnel, and then using the tunnel template to configure, for the first routing device and/or second routing device, the attribute information that is used to establish the MPLS TE tunnel. The tunnel template may be considered as a set of attribute information that is used to establish the MPLS TE tunnel. In this way, when establishing the first MPLS TE tunnel, the first routing device uses a tunnel template and does not need to respectively configure each tunnel; when establishing the second MPLS TE tunnel, the second routing device may also directly use the tunnel template and does not need to respectively configure each tunnel. This manner simplifies configuration of an MPLS TE tunnel to the utmost extent.

Optionally, the first MPLS TE tunnel includes a primary LSP and a backup LSP, and the first path information acquired by the second routing device includes first primary path information corresponding to the primary LSP and first backup path information corresponding to the backup LSP. Further, the second routing device respectively reverses the first primary path information and the first backup path information, to acquire second primary path information corresponding to the primary LSP and second backup path information corresponding to the backup LSP; and then the second routing device establishes, according to the second primary path information and the second backup path information, a primary LSP and a backup LSP from the second VPN instance to the first VPN instance, that is, a primary LSP and a backup LSP in the second MPLS TE tunnel are established.

Optionally, after determining that the second MPLS TE tunnel is established, the second routing device may further send a fifth BGP update message to the first routing device, where the fifth BGP update message includes: the first VPN instance identifier, the second VPN instance identifier, the second RT, and a second identifier, and the second identifier is an identifier of the second MPLS TE tunnel. In this way, integrity of a protocol can be ensured.

In this embodiment, a first routing device announces to a second routing device an identifier of a first MPLS TE tunnel from a first VPN instance on the first routing device to a second VPN instance on the second routing device; the second routing device acquires path information of the first MPLS TE tunnel from the first VPN instance to the second VPN instance according to the identifier, and then if a network condition permits, establishes a second MPLS TE tunnel from the second VPN instance to the first VPN instance according to path information obtained after the path information is reversed, so that the first MPLS TE tunnel from the second VPN instance to the first VPN instance and the second MPLS TE tunnel from the first VPN instance to the second VPN instance are co-routed and in reverse directions, thereby solving or reducing multiple kinds of problems caused by non-co-routing during BFD.

In an optional manner of this embodiment, when the second MPLS TE tunnel that is co-routed with and reverse to the first MPLS TE tunnel cannot be established, the second routing device may further establish a third MPLS TE tunnel that is reverse to and partially co-routed with the first MPLS TE tunnel, thereby reducing, to some extent, multiple kinds of problems caused by non-co-routing during BFD.

Figure 2:
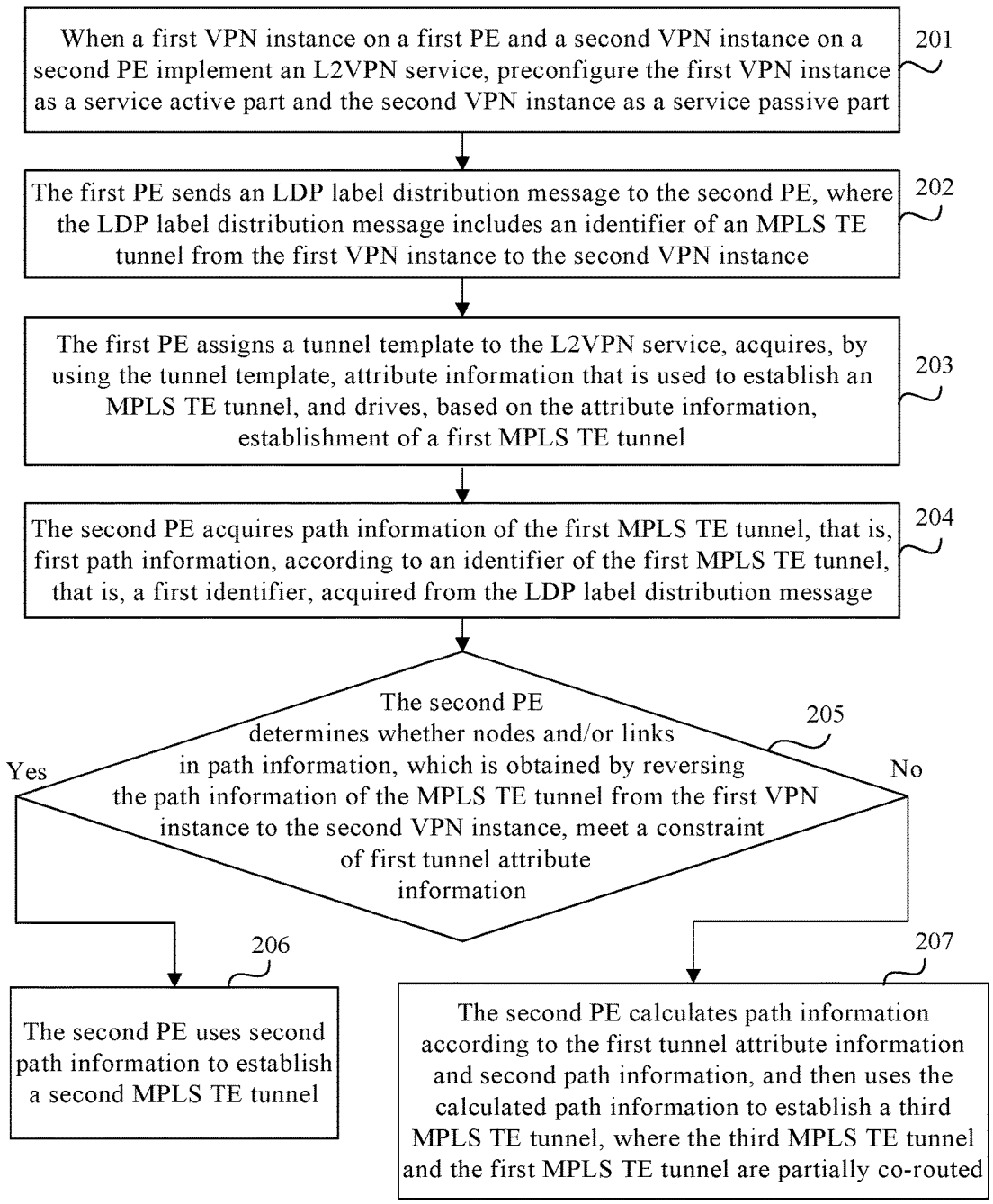
FIG. 2 is a flowchart of an MPLS TE tunnel establishing method according to an embodiment of the present invention.

In the following, embodiments shown in FIG. 2 and FIG. 3 provide optional implementation processes of establishing an MPLS TE tunnel respectively by using an L2VPN service and an L3VPN service as an example.

FIG. 2 is a flowchart of an MPLS TE tunnel establishing method according to an embodiment of the present invention. As shown in FIG. 2, the method in this embodiment includes:

Step 201: When a first VPN instance on a first PE and a second VPN instance on a second PE implement an L2VPN service, preconfigure the first VPN instance as a service active role and the second VPN instance as a service passive role.

Besides the configuring the service active role and the service passive role provided in step 201, a manner of negotiating by using a protocol may further be used to determine the service active role and the service passive role.

This embodiment is described by using an example in which the first VPN instance and the second VPN instance implement an L2VPN service.

Step 202: The first PE sends an LDP label distribution message to the second PE, where the LDP label distribution message includes an identifier of an MPLS TE tunnel from the first VPN instance to the second VPN instance.

The MPLS TE tunnel from the first VPN instance to the second VPN instance is a first MPLS TE tunnel, and the identifier of the MPLS TE tunnel from the first VPN instance to the second VPN instance is a first identifier.

In this embodiment, that the first PE uses the LDP protocol to perform service negotiation with the second PE is used as an example for description, which is not limited thereto. For example, the first PE and the second PE may further use the BGP protocol to perform the service negotiation.

In this embodiment, the first PE extends the LDP protocol; it not only negotiates multiple kinds of information in the prior art with the second PE by using the LDP protocol, but also announces an identifier of the first MPLS TE tunnel to the second PE by using the LDP protocol.

An identifier of an MPLS TE tunnel used by the L2VPN service is related to a type of a tunnel; different types of tunnels use different identifiers. Commonly used tunnel types include an MPLS TE tunnel, an LDP tunnel, and a Generic Routing Encapsulation (Generic Routing Encapsulation, GRE for short) tunnel. This embodiment of the present invention focuses on the MPLS TE tunnel; the LDP tunnel and GRE tunnel generally refer to tunnels selected when a next hop is used as a destination address, which is described herein for integrity consideration.

Optionally, when announcing the identifier of the first MPLS TE tunnel to the second PE, the first PE may further carry tunnel establishing policy instruction information in the LDP label distribution message, so as to notify the second PE of a manner of establishing an MPLS TE tunnel from the second VPN instance to the first VPN instance, thereby improving flexibility of establishing the MPLS TE tunnel from the second VPN instance to the first VPN instance by the second PE. The MPLS TE tunnel from the second VPN instance to the first VPN instance is a second MPLS TE tunnel.

A tunnel establishing policy that is provided by the first PE to the second PE may require that the second MPLS TE tunnel established by the second PE be co-routed with the first MPLS TE tunnel; if they are not co-routed, it is considered that a tunnel fails to be selected for the service.

Optionally, the tunnel establishing policy that is provided by the first PE to the second PE may further be: in a case in which the second MPLS TE tunnel that is co-routed with the first MPLS TE tunnel cannot be established, requiring that a part of the second MPLS TE tunnel that is established by the second PE according to second path information is co-routed with a part of the first MPLS TE tunnel. In this case, although it is not implemented that the first MPLS TE tunnel and the second MPLS TE tunnel are completely co-routed, it is implemented that they are partially co-routed; compared with a case in which the first MPLS TE tunnel and the second MPLS TE tunnel are completely not co-routed, some problems caused by complete non-co-routing can be reduced.

Preferably, when there are multiple MPLS TE tunnels, which are partially co-routed with the first MPLS TE tunnel, from the second VPN instance to the first VPN instance, an MPLS TE tunnel that has a longest co-routed part is selected from the multiple partially co-routed MPLS TE tunnels as the second MPLS TE tunnel, so that problems caused by non-co-routing can be reduced as much as possible.

Correspondingly, the second PE receives the LDP label distribution message sent by the first PE, and acquires the identifier of the first MPLS TE tunnel from the LDP label distribution message. Further, if the LDP label distribution message further includes the tunnel establishing policy instruction information, the second PE may further acquire the tunnel establishing policy instruction information from the LDP label distribution message.

Step 203: The first PE assigns a tunnel template to the L2VPN service, acquires, by using the tunnel template, attribute information that is used to establish an MPLS TE tunnel, and drives, based on the attribute information, establishment of a first MPLS TE tunnel.

The first PE uses the tunnel template to configure, for the L2VPN service, the attribute information that is used to establish an MPLS TE tunnel, and does not need to respectively configure each MPLS TE tunnel, which can reduce a workload of configuring an MPLS TE tunnel and improve configuration efficiency.

Specifically, the first PE uses the acquired attribute information to calculate path information of the first MPLS TE tunnel, that is, first path information, where the first path information includes such information as nodes and links passed by the first MPLSTE tunnel. Then the first PE establishes, according to the first path information, the first MPLS TE tunnel by using the RSVP-TE protocol.

It should be noted that a sequence of step 202 and step 203 is not limited thereto.

Step 204: The second PE acquires path information of the first MPLS TE tunnel, that is, first path information, according to an identifier of the first MPLS TE tunnel, that is, a first identifier, acquired from the LDP label distribution message.

Step 205: The second PE determines whether a node and/or link in second path information that is obtained by reversing the first path information meets a constraint of first tunnel attribute information; if a result of the determining is that the node and/or link in the second path information meets the constraint of the first tunnel attribute information, step 206 is performed; if a result of the determining is that the node and/or link in the second path information does not meet the constraint of the first tunnel attribute information, step 207 is performed.

After acquiring the first path information, the second PE reverses the first path information to obtain the second path information. The first path information or second path information includes information of nodes and links on a corresponding path, and actually includes a series of ordered IP addresses, where a sequence of a series of ordered IP addresses included in the second path information is opposite to a sequence of a series of ordered IP addresses included in the first path information.

Optionally, the second PE acquires attribute information that is used to establish the second MPLS TE tunnel, where the attribute information that is used to establish the second MPLS TE tunnel is the first tunnel attribute information. The first tunnel attribute information may be attribute information that is preconfigured for the L2VPN service by the second PE and used to establish the second MPLS TE tunnel, or may be default attribute information, or may be attribute information that is used to establish the first MPLS TE tunnel by the first PE. The attribute information includes such information as bandwidth information, an explicit path, an affinity attribute, and fast rerouting. Based on this, the second PE compares information of the nodes and links in the second path information with the first tunnel attribute information, and can determine whether the second path information meets a constraint of first attribute information.

Step 206: The second PE uses the second path information to establish a second MPLS TE tunnel.

The second PE establishes the second MPLS TE tunnel according to the second path information, which can implement that the first MPLS TE tunnel and the second MPLS TE tunnel are co-routed.

In step 206, the being co-routed means that the first MPLS TE tunnel and the second MPLS TE tunnel pass same nodes and links, but directions of the two tunnels are opposite.

Optionally, the second PE may send to the first PE an identifier of the second MPLS TE tunnel, that is, a second identifier, and the first PE receives the second identifier sent by the second PE. In this way, integrity of a protocol can be ensured.

Step 207: The second PE calculates path information according to the first tunnel attribute information and the second path information, and then uses the calculated path information to establish a third MPLS TE tunnel, where the third MPLS TE tunnel and the first MPLS TE tunnel are partially co-routed.

It should be noted that the third MPLS TE tunnel in step 207 and the second MPLS TE tunnel in step 206 are both MPLS TE tunnels from the second VPN instance to the first VPN instance, but the two MPLS TE tunnels are not the same.

In this embodiment, the second PE establishes, based on the second path information that is obtained by reversing the first path information, the second MPLS TE tunnel, and in this way, it can be ensured that tunnels in two directions are co-routed or partially co-routed. If a path of the first MPLS TE tunnel changes, a path of the second MPLS TE tunnel can also be easily adjusted accordingly. In this embodiment, that the first MPLS TE tunnel and the second MPLS TE tunnel are co-routed or partially co-routed is not implemented in a static configuration manner, which has a relatively small workload and relatively strong extensibility. In addition, in this embodiment, that forward and reverse bidirectional MPLS TE tunnels are co-routed is not implemented by directly binding two unidirectional MPLS TE tunnels. When a path of one MPLS TE tunnel changes, a path of the other MPLS TE tunnel may change accordingly by means of only relatively little processing, and a case, in which a path of one tunnel changes but a path of the other tunnel cannot change accordingly when two unidirectional MPLS TE tunnels are directly bound to implement co-routing and therefore forward and reverse bidirectional tunnels are not co-routed, will not occur.

In this embodiment, during a process in which the first PE and the second PE perform L2VPN service negotiation, the first PE announces the identifier of the used MPLS TE tunnel to the second PE; the second PE acquires, based on the identifier announced by the first PE, the first path information, and uses the second path information that is obtained by reversing the first path information to establish the second MPLS TE tunnel. If a network condition permits, that the first MPLS TE tunnel and the second MPLS TE tunnel are co-routed or partially co-routed is implemented, thereby solving or reducing multiple kinds of problems caused by non-co-routing during BFD. If the first MPLS TE tunnel and the second MPLS TE tunnel are not co-routed, at least problems related to BFD are brought. For example, when a reverse IP path is blocked and a path status of a forward MPLS TE tunnel is actually normal, non-co-routing may trigger a problem that a BFD status is set to down. For another example, when MPLS TE hot-standby (Hot-standby) protection is deployed, non-co-routing may further trigger problems that unnecessary switching occurs between MPLS TE tunnels, and even the switching is unsuccessful, which requires a wait for hard convergence and causes a large number of packet losses, and high reliability of a service cannot be ensured.

Figure 3A:
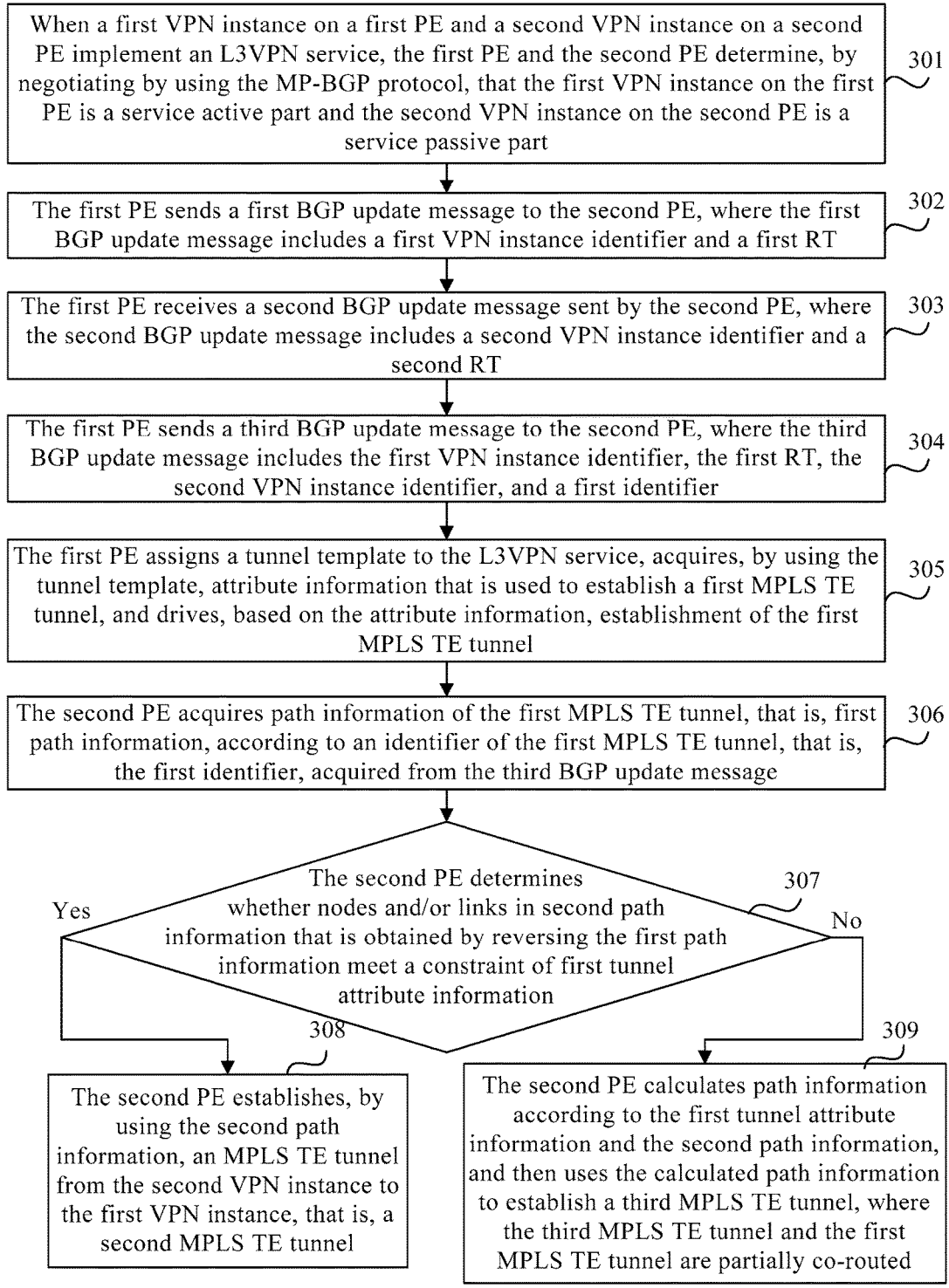
FIG. 3A is a flowchart of an MPLS TE tunnel establishing method according to an embodiment of the present invention.

FIG. 3A is a flowchart of an MPLS TE tunnel establishing method according to an embodiment of the present invention. As shown in FIG. 3A, the method in this embodiment includes the following content:

Step 301: When a first VPN instance on a first PE and a second VPN instance on a second PE implement an L3VPN service, the first PE and the second PE determine, by negotiating by using the MP-BGP protocol, that the first VPN instance on the first PE is a service active role and the second VPN instance on the second PE is a service passive role.

Besides a manner of negotiating by using a protocol to determine the service active role and the service passive role provided in step 301, a manner of configuring may further be used to determine the service active role and the service passive role.

This embodiment is described by using an example in which the first VPN instance and the second VPN instance implement an L3VPN service.

Step 302: The first PE sends a first BGP update message to the second PE, where the first BGP update message includes a first VPN instance identifier and a first RT.

Step 303: The first PE receives a second BGP update message sent by the second PE, where the second BGP update message includes a second VPN instance identifier and a second RT.

A VPN instance identifier of the first PE is used to identify the first VPN instance. The second VPN instance identifier is used to identify the second VPN instance. The first RT and the second RT are mainly used by the first PE and/or the second PE to determine whether there is a service peer relationship between the first VPN instance and the second VPN instance. In this embodiment, after it is determined that the first RT is equal to the second RT, the first PE and the second PE can determine that there is a service peer relationship between the first VPN instance and the second VPN instance.

In this embodiment, the first PE extends the MP-BGP protocol; it not only sends some information in the prior art to the second PE by using the first BGP update message, but also carries the first VPN instance identifier in the first BGP update message and sends the message to the second PE. Correspondingly, the second PE receives the first BGP update message sent by the first PE, and acquires the first VPN instance identifier from the first BGP update message.

The second PE sends the second BGP update message to the first PE, and carries the second VPN instance identifier in the second BGP update message. The first PE receives the second BGP update message sent by the second PE, and acquires the second VPN instance identifier from the second BGP update message. In the foregoing manner, identifying the VPN instances on the first PE and the second PE is implemented, which implements that VPN instances learn from each other.

Specifically, the first PE may carry the first VPN instance identifier in an NRLI object in the first BGP update message; the second PE may carry the second VPN instance identifier in an NRLI object in a second BGP notification message. Optionally, the first RT or second RT may also be carried in NRLI.

Step 304: The first PE sends a third BGP update message to the second PE, where the third BGP update message includes the first VPN instance identifier, the first RT, the second VPN instance identifier, and a first identifier.

The first identifier is an identifier of a first MPLS TE tunnel.

Figure 3B:
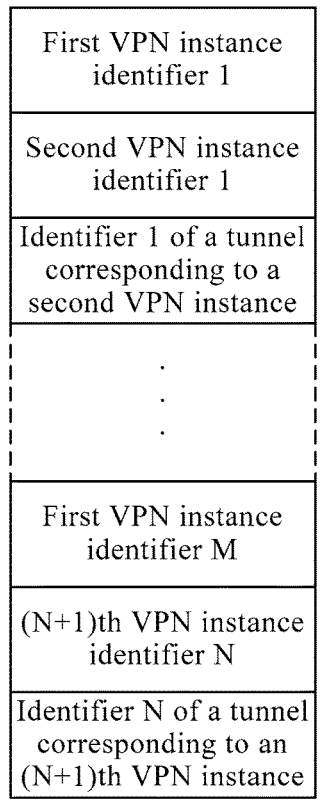
FIG. 3B is a schematic structural diagram of a BGP notification message that carries multiple identifiers according to an embodiment of the present invention.

Correspondingly, the second PE receives the third BGP update message sent by the first PE, and acquires the first identifier from the third BGP update message. If the first VPN instance implements an L3VPN service with multiple VPN instances at the same time, identifiers of multiple MPLS TE tunnels from a first VPN to the multiple VPN instances may be carried in a same third BGP update message at the same time, of which structure is shown in FIG. 3B. In the third BGP update message shown in FIG. 3B, identifiers of N VPN instances and N MPLS TE tunnels are included in total, which are: a second VPN instance identifier 1 to an (N+1)th VPN instance identifier N, and an identifier 1 of a tunnel corresponding to a second VPN instance to an identifier N of a tunnel corresponding to an (N+1)th VPN instance; first VPN instance identifiers are: a first VPN instance identifier 1 to a first VPN instance identifier M. For the convenience of graphical representation, an RT of the first VPN instance is not shown in FIG. 3B.

Step 305: The first PE assigns a tunnel template to the L3VPN service, acquires, by using the tunnel template, attribute information that is used to establish a first MPLS TE tunnel, and drives, based on the attribute information, establishment of the first MPLS TE tunnel.

The first PE uses the tunnel template to configure, for the L3VPN service, attribute information that is used to establish an MPLS TE tunnel, and does not need to respectively configure each MPLS TE tunnel, which can reduce a workload of configuring an MPLS TE tunnel and improve configuration efficiency.

Specifically, the first PE uses the acquired attribute information to calculate path information of the first MPLS TE tunnel, that is, first path information, where the first path information includes such information as nodes and links passed by the first MPLS TE tunnel. Then the first PE establishes, according to the first path information, the first MPLS TE tunnel by using the RSVP-TE protocol.

It should be noted that a sequence of step 305 and the foregoing step 302 to step 304 is not limited thereto.

Step 306: The second PE acquires path information of the first MPLS TE tunnel, that is, first path information, according to an identifier of the first MPLS TE tunnel, that is, the first identifier, acquired from the third BGP update message.

Step 307: The second PE determines whether a node and/or link in second path information that is obtained by reversing the first path information meets a constraint of first tunnel attribute information; if a result of the determining is that the node and/or link in the second path information meets the constraint of the first tunnel attribute information, step 308 is performed; if a result of the determining is that the node and/or link in the second path information does not meet the constraint of the first tunnel attribute information, step 309 is performed.

Step 308: The second PE uses the second path information to establish an MPLS TE tunnel from the second VPN instance to the first VPN instance, that is, a second MPLS TE tunnel.

Step 309: The second PE calculates path information according to the first tunnel attribute information and the second path information, and then uses the calculated path information to establish a third MPLS TE tunnel, where the third MPLS TE tunnel and the first MPLS TE tunnel are partially co-routed.

It should be noted that the third MPLS TE tunnel in step 309 and the second MPLS TE tunnel in step 308 are both tunnels from the second VPN instance to the first VPN instance, but the two MPLS TE tunnels are not the same.

For the foregoing step 306 to step 309, reference may be made to descriptions of step 204 to step 207, which are not further described herein.

In this embodiment, during a process in which the first PE and the second PE perform L3VPN service negotiation, the first PE announces the first identifier to the second PE; the second PE determines, based on the first identifier, the first path information. The second PE further establishes the second MPLS TE tunnel according to the second path information that is acquired based on the first path information, which implements that forward and reverse bidirectional MPLS TE tunnels are co-routed or partially co-routed. Therefore, problems that are generated because two MPLS TE tunnels in reverse directions between two VPN instances are not co-routed can be solved or reduced. For example, when a reverse IP path is blocked and a path status of a forward MPLS TE tunnel is actually normal, non-co-routing may trigger a problem that a BFD status is set to down. For another example, when MPLS TE hot-standby (Hot-standby for short) protection is deployed, non-co-routing may further trigger problems that unnecessary switching occurs between MPLS TE tunnels, and even the switching is unsuccessful, which requires a wait for hard convergence and causes a large number of packet losses, and high reliability of a service cannot be ensured.

Figure 4:
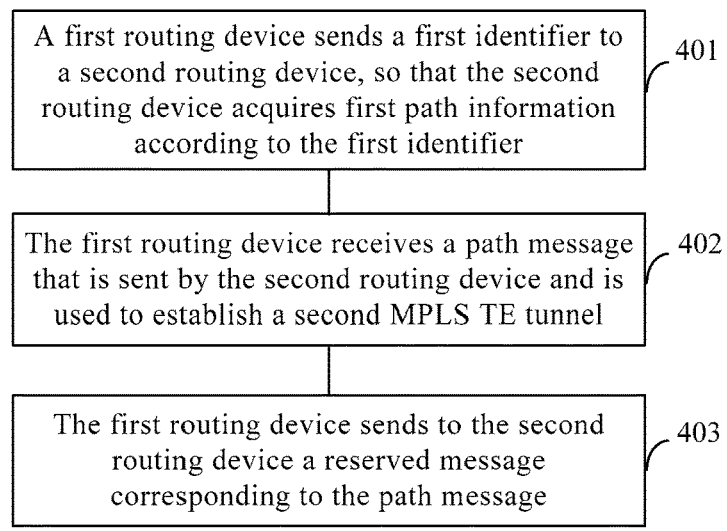
FIG. 4 is a flowchart of a method for establishing an MPLS TE tunnel according to an embodiment of the present invention.

As shown in FIG. 4, an embodiment of the present invention provides a method for establishing an MPLS TE tunnel, where the method includes the following content:

Step 401: A first routing device sends a first identifier to a second routing device, so that the second routing device acquires first path information according to the first identifier, where the first identifier is an identifier of a first MPLS TE tunnel, the first path information is path information of the first MPLS TE tunnel, and the first MPLS TE tunnel is an MPLS TE tunnel from a first VPN instance on the first routing device to a second VPN instance on the second routing device.

Step 402: The first routing device receives a path message that is sent by the second routing device and is used to establish a second MPLS TE tunnel, where the second MPLS TE tunnel is an MPLS TE tunnel from the second VPN instance to the first VPN instance, and path information of the second MPLS TE tunnel is obtained by reversing the first path information.

Step 403: The first routing device sends to the second routing device a reserved message corresponding to the path message.

The second MPLS TE tunnel and the first MPLS TE tunnel are co-routed and in reverse directions.

The path message and the reserved message are both messages in the RSVP TE.

After the foregoing steps are performed, if a network condition permits, the second MPLS TE tunnel can be established, thereby solving or reducing multiple kinds of problems caused by non-co-routing during BFD.

In this embodiment, the first VPN instance on the first routing device is a service active role of a service between the first VPN instance and the second VPN instance; the second VPN instance on the second routing device is a service passive role of the service between the first VPN instance and the second VPN instance.

In this embodiment, after determining the identifier of the first MPLS TE tunnel, that is, the first identifier, the first routing device may notify the second routing device of the first identifier by using signaling. The second routing device queries, according to the first identifier, a correspondence between the first identifier and the path information of the first MPLS TE tunnel, and acquires the path information of the first MPLS TE tunnel, that is, the first path information. Further, the second routing device may reverse the first path information to obtain second path information, and then establish, based on the second path information, the second MPLS TE tunnel. The second MPLS TE tunnel is an MPLS TE tunnel from the second VPN instance to the first VPN instance.

The correspondence between the first identifier and the path information of the first MPLS TE tunnel is sent to the second routing device by the first routing device by using a path message during a process of establishing the first MPLS TE tunnel. The path information of the first MPLS TE tunnel, that is, the first path information, is carried in an RRO object of the path message, and the identifier of the first MPLS TE tunnel is carried in a session object of the path message. Optionally, in a manner of extending a protocol, the first identifier and/or the first path information may be carried in an extended field of the path message. A process in which the first routing device establishes the first MPLS TE tunnel is independent of step 401, of which sequence in terms of time may not be limited. Optionally, the service between the first VPN instance and the second VPN instance may be an L3VPN service, and the first routing device may use the MP-BGP to perform service negotiation with the second routing device. Based on this, the first routing device may extend the MP-BGP protocol, and announces the first identifier to the second routing device by using the extended MP-BGP protocol.

In an existing L3VPN mechanism, a VPN route and a VPN local label are announced between the first routing device and the second routing device. There are multiple IP routes in one VPN instance, and the VPN route refers to an IP route in each VPN instance. It makes no sense to carry a tunnel identifier for a specified VPN route, because an identifier of an MPLS TE tunnel is associated with a service, and the service is corresponding to a VPN instance but not a VPN route. Based on this, a process of extending the MP-BGP and announcing the first identifier includes a process of identifying the first VPN instance on the first routing device and the second VPN instance on the second routing device, and a process of announcing the first identifier after identifying the VPN instances.

Figure 5:
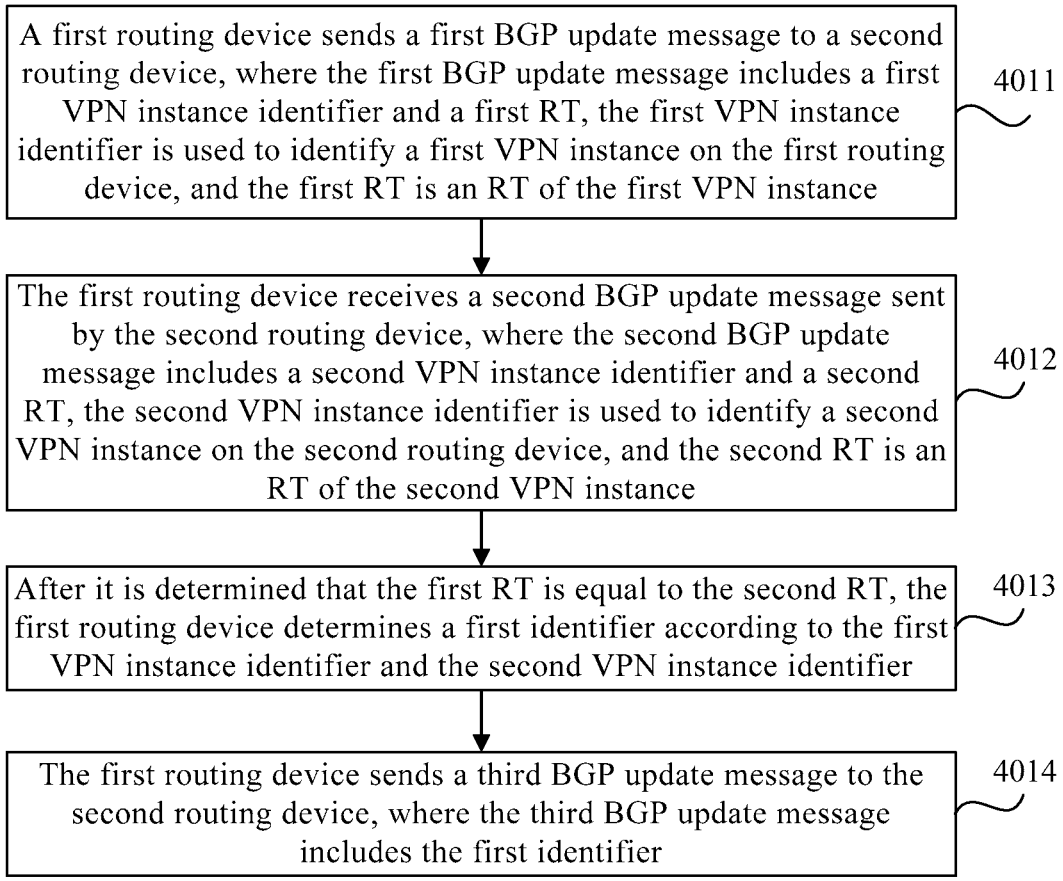
FIG. 5 is a flowchart of sending, by a first routing device, a first identifier to a second routing device according to an embodiment of the present invention.

As shown in FIG. 5, when the service between the first VPN instance and the second VPN instance is an L3VPN service, a manner of implementing that the first routing device sends the first identifier to the second routing device shown in FIG. 4 includes the following content:

Step 4011: The first routing device sends a first BGP update message to the second routing device, where the first BGP update message includes a first VPN instance identifier and a first RT, the first VPN instance identifier is used to identify the first VPN instance on the first routing device, and the first RT is an RT of the first VPN instance.

Step 4012: The first routing device receives a second BGP update message sent by the second routing device, where the second BGP update message includes a second VPN instance identifier and a second RT, the second VPN instance identifier is used to identify the second VPN instance on the second routing device, and the second RT is an RT of the second VPN instance.

The second BGP update message is sent after the second routing device determines that the first RT is equal to the second RT.

The foregoing description is a process in which the first routing device and the second routing device learn from each other and identify VPN instances; for detailed description, reference may be made to step 101.

Step 4013: After it is determined that the first RT is equal to the second RT, the first routing device determines the first identifier according to the first VPN instance identifier and the second VPN instance identifier. The first MPLS TE tunnel may be determined according to the first VPN instance identifier and the second VPN instance identifier; correspondingly, the first identifier may also be determined. A specific method of determining the first identifier includes: when the first identifier has been allocated to the first MPLS TE tunnel, acquiring the first identifier; and when no first identifier has been allocated to a first MPLS tunnel, allocating the first identifier and acquiring the first identifier.

Step 4014: The first routing device sends a third BGP update message to the second routing device, where the third BGP update message includes the first identifier.

Optionally, besides the first identifier, the third BGP update message may further include such information as the first VPN instance identifier, the second VPN instance identifier, and the first RT.

The first routing device extends a BGP update message, thereby implementing an objective of announcing the first identifier to the second routing device; for a specific process, reference may be made to the descriptions in step 101.

Further, the first routing device and the second routing device may carry an RT of a VPN instance and a VPN instance identifier by using attribute information and NRLI, or carry a VPN instance identifier and an RT of a VPN instance by using NLRI.

Based on what is described above, a process in which the first routing device sends the first BGP update message to the second routing device may be: encapsulating, by the first routing device, the first RT in attribute information in the first BGP update message, encapsulating the first VPN instance identifier in an NLRI object in the first BGP update message, and then sending to the second routing device the first BGP update message in which the first RT and the first VPN instance identifier are encapsulated. Alternatively, the process in which the first routing device sends the first BGP update message to the second routing device may further be: encapsulating, by the first routing device, the first RT and the first VPN instance identifier in an NLRI object in the first BGP update message, and then sending to the second routing device the first BGP update message in which the first RT and the first VPN instance identifier are encapsulated. Correspondingly, a process in which the first routing device receives the second BGP update message sent by the second routing device may be: receiving, by the first routing device, the second BGP update message sent by the second routing device, parsing the second BGP update message, acquiring the second RT from attribute information in the second BGP update message, and acquiring the second VPN instance identifier from an NLRI object in the second BGP update message. Alternatively, the process in which the first routing device receives the second BGP update message sent by the second routing device may further be: receiving, by the first routing device, the second BGP update message sent by the second routing device, parsing the second BGP update message, and acquiring the second VPN instance identifier and the second RT from an NLRI object in the second BGP update message.

Further, a VPN instance identifier in this embodiment may include RD information and an IP address. For example, the first VPN instance identifier includes a first RD and a first IP address, where the first RD is an RD of the first VPN instance, and the first IP address is an IP address of the first routing device. The second VPN instance identifier includes a second RD and a second IP address, where the second RD is an RD of the second VPN instance, and the second IP address is an IP address of the second routing device. For detailed descriptions about the VPN instance identifiers, reference may be made to the descriptions in step 101.

Optionally, before a role as which the first VPN instance and the second VPN instance respectively act in the service between the first VPN instance and the second VPN instance is determined, the first routing device and the second routing device may compare values of the first VPN instance identifier and the second VPN instance identifier, and determine a role of the first VPN instance and a role of the second VPN instance according to a result of the comparing and a role determining rule. In this embodiment, the role determining rule may be set to: when the first VPN instance identifier is greater than the second VPN instance identifier, determining that the first VPN instance is the service active role and the second VPN instance is the service passive role; or the role determining rule may be set to: when the first VPN instance identifier is less than the second VPN instance identifier, determining that the first VPN instance is the service active role and the second VPN instance is the service passive role.

Optionally, besides the foregoing method for determining the first VPN instance and the second VPN instance, the first routing device and the second routing device may further respectively determine the roles of the first VPN instance and the second VPN instance according to role information received from a management device in advance or role information preconfigured in the first routing device and the second routing device.

In addition, after determining, according to the first VPN instance identifier and the second VPN instance identifier, that the first MPLS TE tunnel needs to be established between the first VPN instance and the second VPN instance, the first routing device may trigger, according to the IP address of the second routing device and attribute information that is required for establishing the first MPLS TE tunnel, a process of establishing the first MPLS TE tunnel. Specifically, the first routing device may establish the first MPLS TE tunnel according to preconfigured attribute information that is required for establishing an MPLS TE tunnel. More specifically, the first routing device may calculate the first path information by using preconfigured attribute information that is required for establishing the first MPLS TE tunnel, and establish the first MPLS TE tunnel according to the first path information by using the RSVP-TE. Further, the first routing device may also establish the first MPLS TE tunnel according to the preconfigured attribute information that is required for establishing an MPLS TE tunnel, and at the same time according to a tunnel policy for establishing an MPLS TE tunnel by using the preconfigured attribute information that is required for establishing an MPLS TE tunnel.

A process in which the first routing device sends the first identifier to the second routing device by using the third BGP update message is independent of the process in which the first routing device establishes the first MPLS TE tunnel, of which sequence is not limited by this embodiment of the present invention.

Optionally, preconfiguring the attribute information that is used to establish an MPLS TE tunnel may be: preconfiguring a tunnel template that is used to establish the MPLS TE tunnel, and configuring, by using the tunnel template, attribute information that is used to establish the first MPLS TE tunnel. The tunnel template may be considered as a set of attribute information that is used to establish an MPLS TE tunnel. In this way, the first routing device does not need to allocate and configure attribute information for each MPLS TE tunnel, which can reduce a workload of configuring an MPLS TE tunnel.

Optionally, the first routing device may further receive a fifth BGP update message sent by the second routing device, and acquire a second identifier from the fifth BGP update message, where the second identifier is an identifier of the second MPLS TE tunnel. Specifically, after determining that the second MPLS TE tunnel is to be established, the second routing device may send the fifth BGP update message to the first routing device, where the fifth BGP update message includes: the first VPN instance identifier, the second VPN instance identifier, the second RT, and the second identifier. In this way, integrity of a protocol can be ensured.

Optionally, the first routing device may further send tunnel establishing policy instruction information to the second routing device, where the tunnel establishing policy instruction information is used to instruct the second routing device to directly establish the second MPLS TE tunnel according to the second path information, or is used to instruct, when a link and/or node in the second path information meets a constraint of the first tunnel attribute information, the second routing device to use the second path information to establish the second MPLS TE tunnel, or is used to instruct, when the link and/or node in the second path information does not meet the constraint of the first tunnel attribute information, the second routing device to use the third path information calculated according to the first tunnel attribute information, to establish the third MPLS TE tunnel. The directly using the second path information to establish the second MPLS TE tunnel means that, in a case in which whether the link and/or node in the second path information meets the constraint of the first tunnel attribute information is not checked, the second path information is used to establish the second MPLS TE tunnel. The third MPLS TE tunnel and the first MPLS TE tunnel are in reverse directions and partially co-routed.

Optionally, the service between the first routing device and the second routing device may be an L2VPN service. In this case, the first routing device may use a dynamic protocol, such as the LDP or BGP, to perform service negotiation with the second routing device. Based on this, the first routing device may extend the LDP or BGP protocol, and announces the first identifier to the second routing device by using the extended LDP or BGP protocol. For example, the first routing device may send an LDP label distribution message or a fourth BGP update message to the second routing device, where the LDP label distribution message or fourth BGP update message includes the first identifier.

In this embodiment, the first routing device provides the second routing device with the identifier of the MPLS TE tunnel from the first VPN instance on the first routing device to the second VPN instance on the second routing device, so that the second routing device may acquire, according to the identifier, the path information of the MPLS TE tunnel from the first VPN instance to the second VPN instance, that is, the first path information, and then the second routing device obtains path information, that is, the second path information, by reversing the acquired path information. The first routing device receives the path message that is used to establish the second MPLS TE tunnel, sends the reserved message, and if a network condition permits, establishes, with the second routing device and according to the RSVP-TE, the second MPLS TE tunnel that is reverse to and co-routed with the first MPLS TE tunnel, which can reduce or solve multiple kinds of problems that are triggered during BFD because forward and reverse tunnels are not co-routed. In an optional manner of this embodiment, the first routing device instructs the second routing device to establish, when the second MPLS TE tunnel cannot be established, the third MPLS TE tunnel, and the third MPLS TE tunnel and the first MPLS TE tunnel are in reverse directions and partially co-routed, so as to reduce, to some extent, the multiple kinds of problems caused by non-co-routing during BFD.

Figure 6:
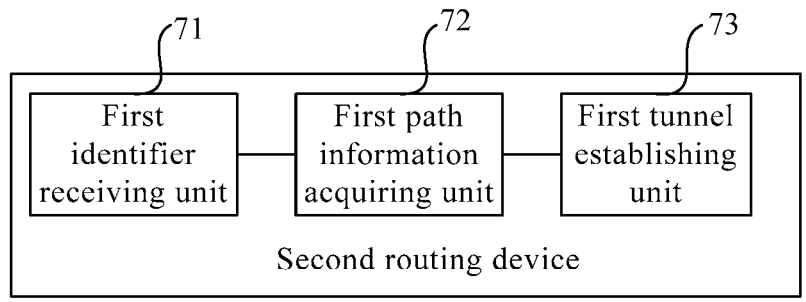
FIG. 6 is a schematic structural diagram of a routing device according to an embodiment of the present invention.

FIG. 6 is a schematic structural diagram of a second routing device according to an embodiment of the present invention. As shown in FIG. 6, the second routing device in this embodiment includes: a first identifier receiving unit 71, a first path information acquiring unit 72, and a first tunnel establishing unit 73.

The first identifier receiving unit 71 is configured to receive a first identifier sent by a first routing device, where the first identifier is an identifier of a first MPLS TE tunnel. The first MPLS TE tunnel is an MPLS TE tunnel from a first VPN instance on the first routing device to a second VPN instance on the second routing device.

The first path information acquiring unit 72 is configured to acquire first path information according to the first identifier received by the first identifier receiving unit 71, where the first path information is path information of the first MPLS TE tunnel. Optionally, the first path information acquiring unit 72 is connected to the first identifier receiving unit 71.

The first tunnel establishing unit 73 is configured to reverse the first path information acquired by the first path information acquiring unit 72, to acquire second path information, and establish a second MPLS TE tunnel according to the second path information. The second MPLS TE tunnel is an MPLS TE tunnel from the second VPN instance to the first VPN instance. The second MPLS TE tunnel and the first MPLS TE tunnel are in reverse directions and co-routed. Optionally, the first tunnel establishing unit 73 is connected to the first path information acquiring unit 72.

Optionally, the first identifier receiving unit 71 is a physical interface, the first path information acquiring unit 72 is a first processor, and the first tunnel establishing unit 73 is a second processor. The first processor and the second processor may be a same processor, or may be different processors.

The second MPLS TE tunnel and the first MPLS TE tunnel are co-routed and in reverse directions.

Functional units of the second routing device in this embodiment may be used to perform a process of the MPLS TE tunnel establishing method shown in FIG. 1, a specific working principle is not further described, and reference may be made to the description in the method embodiment.

The second routing device in this embodiment may be a PE, but is not limited to that.

The second routing device in this embodiment may cooperate with the first routing device, receives the first identifier sent by the first routing device, acquires the first path information according to the first identifier, then reverses the acquired first path information to obtain the second path information, and if a network condition permits, establishes, based on the second path information obtained after the reversing, the second MPLS TE tunnel, so that the established second MPLS TE tunnel and the first MPLS TE tunnel are co-routed, thereby solving or reducing multiple kinds of problems caused by non-co-routing during BFD.

Figure 7:
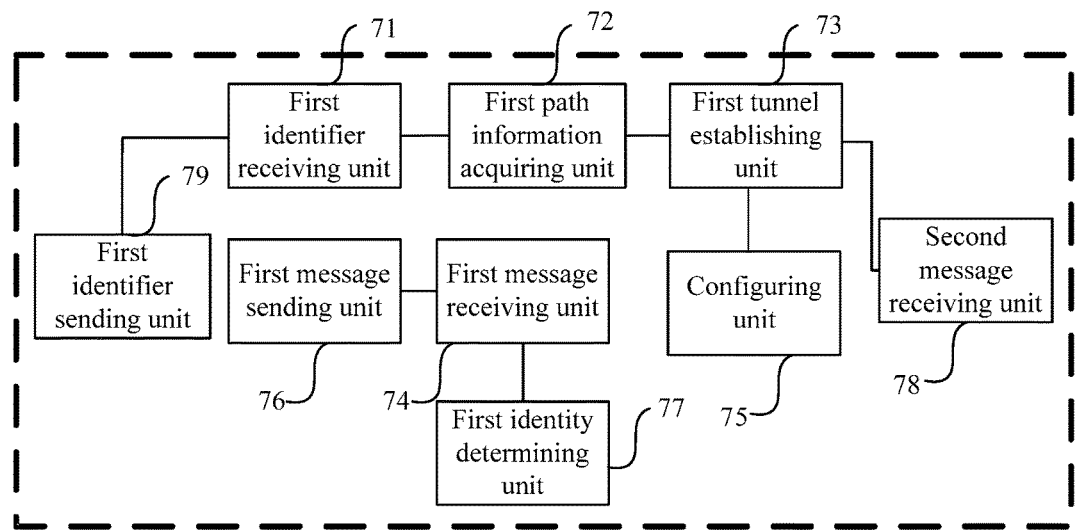
FIG. 7 is a schematic structural diagram of a routing device according to an embodiment of the present invention.

FIG. 7 is a schematic structural diagram of a second routing device according to an embodiment of the present invention. This embodiment may be implemented based on the embodiment shown in FIG. 6. As shown in FIG. 7, the second routing device in this embodiment also includes: the first identifier receiving unit 71, the first path information acquiring unit 72, and the first tunnel establishing unit 73.

The first path information acquiring unit 72 in this embodiment may specifically query, according to the first identifier, a correspondence between the first identifier and the path information of the first MPLS TE tunnel, and acquire the path information of the first MPLS TE tunnel, that is, the first path information. The correspondence between the first identifier and the path information of the first MPLS TE tunnel is sent to the second routing device by the first routing device by using a path (path) message during a process of establishing the first MPLS TE tunnel, where the path message refers to a path message in the RSVP-TE. The path information of the first MPLS TE tunnel is carried in an RRO object of the path message, and the identifier of the first MPLS TE tunnel is carried in a session object of the path message. Optionally, in a manner of extending a protocol, the first identifier and/or the first path information may be carried in an extended field of the path message. The process of establishing the first MPLS TE tunnel by the first routing device is independent of step 401, of which sequence in terms of time may not be limited.

Optionally, the first path information acquiring unit 72 may further specifically be configured to determine, according to the first identifier and a first correspondence that are acquired by the first identifier receiving unit 71, the first MPLS TE tunnel identified by the first identifier, and query a second correspondence according to an identifier of the first MPLS TE tunnel, to acquire the first path information. The first correspondence is a correspondence between the first identifier and the first MPLS TE tunnel; the second correspondence is a correspondence between the identifier of the first MPLS TE tunnel and the first path information.

Further, the first tunnel establishing unit 73 in this embodiment may specifically be configured to directly use the second path information to establish the second MPLS TE tunnel. That is, the second routing device does not determine whether a link and/or node in the second path information meets a constraint of first tunnel attribute information, and directly establishes the second MPLS TE tunnel. If a network condition permits, this manner is practicable.

Optionally, the first tunnel establishing unit 73 may further specifically be configured to: determine whether a link and/or node in the second path information meets a constraint of first tunnel attribute information; and after determining that the link and/or node in the second path information meets the constraint of the first tunnel attribute information, use the second path information to establish the second MPLS TE tunnel.

Further, the first tunnel establishing unit 73 in this embodiment may further be configured to: after determining that the link and/or node in the second path information does not meet the constraint of the first tunnel attribute information, calculate third path information according to the first tunnel attribute information, and then use the third path information to establish a third MPLS TE tunnel. The first tunnel attribute information is attribute information that is required for establishing the first MPLS TE tunnel by the first routing device, or attribute information that is preconfigured by the second routing device in this embodiment and required for establishing the second MPLS TE tunnel, or default attribute information that is required for establishing the second MPLS TE tunnel by the second routing device in this embodiment. The third MPLS TE tunnel and the first MPLS TE tunnel are in reverse directions and partially co-routed.

Optionally, the routing device in this embodiment may further include: a second message receiving unit 78. The second message receiving unit 78 is configured to receive tunnel establishing policy instruction information sent by the first routing device, where the tunnel establishing policy instruction information is used to instruct the second routing device to directly use the second path information to establish the second MPLS TE tunnel, or, the tunnel establishing policy instruction information is used to instruct, when the link and/or node in the second path information meets the constraint of the first tunnel attribute information, the second routing device to use the second path information to establish the second MPLS TE tunnel, or, the tunnel policy instruction information is used to instruct, when the link and/or node in the second path information does not meet the constraint of the first tunnel attribute information, the second routing device to use the third path information calculated according to the first tunnel attribute information, to establish the third MPLS TE tunnel. The directly using the second path information to establish the second MPLS TE tunnel means that, in a case in which it is not determined whether the link and/or node in the second path information meets the constraint of the first tunnel attribute information, the second path information is used to establish the second MPLS TE tunnel. Optionally, the second message receiving unit 78 is connected to the first tunnel establishing unit 73.

Optionally, the first MPLS TE tunnel includes a primary LSP and a backup LSP. Based on this, the first path information acquiring unit 72 may further specifically be configured to respectively acquire, according to role information of LSPs in the first MPLS TE tunnel, first primary path information corresponding to the primary LSP and first backup path information corresponding to the backup LSP. Correspondingly, the first tunnel establishing unit 73 may further specifically be configured to respectively reverse the first primary path information and the first backup path information, to acquire second primary path information corresponding to the primary LSP and second backup path information corresponding to the backup LSP, and then respectively establish a primary LSP and a backup LSP in the second MPLS TE tunnel according to the second primary path information and the second backup path information.

Optionally, the routing device in this embodiment further includes: a configuring unit 75. The configuring unit 75 is configured to use a preconfigured tunnel template that is used to establish the second MPLS TE tunnel, to configure the attribute information that is required for establishing the second MPLS TE tunnel.

Optionally, the routing device in this embodiment may further include: a first identifier sending unit 79.

The first identifier sending unit 79 is configured to send a fifth BGP update message to the first routing device, where the fifth BGP update message includes a second VPN instance identifier, a second RT, a first VPN instance identifier, and a second identifier, and the second identifier is an identifier of the second MPLS TE tunnel. Optionally, the first identifier sending unit 79 is connected to the first identifier receiving unit 71.

In this embodiment, the first VPN instance is a service active role of a service between the first VPN instance and the second VPN instance, and the second VPN instance is a service passive role of the service between the first VPN instance and the second VPN instance.

Optionally, the service between the first VPN instance and the second VPN instance may be an L3VPN service.

When the service between the first VPN instance and the second VPN instance is an L3VPN service, the routing device in this embodiment may further include: a first message receiving unit 74 and a first message sending unit 76.

The first message receiving unit 74 is configured to receive a first BGP update message sent by the first routing device, where the first BGP update message includes the first VPN instance identifier and a first RT, the first VPN instance identifier is used to identify the first VPN instance on the first routing device, and the first RT is an RT of the first VPN instance.

The first message sending unit 76 is configured to send a second BGP update message to the first routing device after determining that the first RT is equal to the second RT, where the second BGP update message includes the second VPN instance identifier and the second RT, the second RT is an RT of the second VPN instance, and the second VPN instance identifier is used to identify the second VPN instance. Optionally, the first message receiving unit 74 is connected to the first message sending unit 76.

Based on what is described above, the first identifier receiving unit 71 is specifically configured to receive a third BGP update message sent by the first routing device, where the third BGP update message includes the first identifier, and the third BGP update message is sent after the first routing device receives the second BGP update message. Optionally, the first identifier receiving unit 71 is specifically configured to: after the first message sending unit 76 sends the second BGP update message to the first routing device, receive the third BGP update message sent by the first routing device.

Optionally, the third BGP update message may further include: the first VPN instance identifier, the first RT, and the second VPN instance identifier.

Further, the first message receiving unit 74 in this embodiment is specifically configured to receive the first BGP update message sent by the first routing device, parse the first BGP update message, acquire the first RT from attribute information in the first BGP update message, and acquire the first VPN instance identifier from an NLRI object in the first BGP update message. Alternatively, the first message receiving unit 74 is specifically configured to receive the first BGP update message sent by the first routing device, parse the first BGP update message, and acquire the first VPN instance identifier and the first RT from an NLRI object in the first BGP update message.

Correspondingly, the first message sending unit 76 in this embodiment is specifically configured to encapsulate the second RT in attribute information in the second BGP update message, encapsulate the second VPN instance identifier in an NLRI object in the second BGP update message, and then send to the first routing device the second BGP update message in which the second RT and the second VPN instance identifier are encapsulated. Alternatively, the first message sending unit 76 is specifically configured to encapsulate the second RT and the second VPN instance identifier in an NLRI object in the second BGP update message, and then send to the first routing device the second BGP update message in which the second RT and the second VPN instance identifier are encapsulated.

Further, the second routing device in this embodiment may further include: a first identity determining unit 77.

The first identity determining unit 77 is configured to determine, according to the first VPN instance identifier and the second VPN instance identifier that are received by the first message receiving unit 74, that the second VPN instance is a service passive role. For example, a determining rule may be set to: when a value of the first VPN instance identifier is greater than a value of the second VPN instance identifier, determining that the second VPN instance is the service passive role. Certainly, the determining rule may also be set to: when the value of the first VPN instance identifier is less than the value of the second VPN instance identifier, determining that the second VPN instance is the service passive role. Optionally, the first identity determining unit 77 is connected to the first message receiving unit 74.

Optionally, the first VPN instance identifier includes a first RD and a first IP address, where the first RD is an RD of the first VPN instance, and the first IP address is an IP address of the first routing device.

The second VPN instance identifier includes a second RD and a second IP address, where the second RD is an RD of the second VPN instance, and the second IP address is an IP address of the routing device in this embodiment.

Optionally, the service between the first VPN instance and the second VPN instance may be an L2VPN service. When the service between the first VPN instance and the second VPN instance is an L2VPN service, the first identifier receiving unit 71 in this embodiment is specifically configured to receive an LDP label distribution message or a fourth BGP update message sent by the first routing device, where the LDP label distribution message or fourth BGP update message includes the first identifier.

The foregoing functional units in this embodiment may be used in a corresponding process of the foregoing MPLS TE tunnel establishing method embodiment, a specific working principle is not further described, and reference may be made to the description in the method embodiment shown in FIG. 1.

The second routing device in this embodiment cooperates with the first routing device, receives the identifier, which is sent by the first routing device, of the MPLS TE tunnel from the first VPN instance to the second VPN instance, acquires, according to the identifier, the path information of the MPLS TE tunnel from the first VPN instance to the second VPN instance, that is, the first path information, then reverses the acquired first path information to obtain the second path information, and establishes, based on the second path information obtained after the reversing, the MPLS TE tunnel from the second VPN instance to the first VPN instance, so that the established MPLS TE tunnel and the MPLS TE tunnel from the first VPN instance to the second VPN instance can be co-routed and in reverse directions if a network condition permits, thereby solving or reducing multiple kinds of problems caused by non-co-routing during BFD. In an optional manner of this embodiment, when the second MPLS TE tunnel that is co-routed with and reverse to the first MPLS TE tunnel cannot be established, the second routing device may further establish the third MPLS TE tunnel that is reverse to and partially co-routed with the first MPLS TE tunnel, thereby reducing, to some extent, the multiple kinds of problems caused by non-co-routing during BFD.

Figure 8:
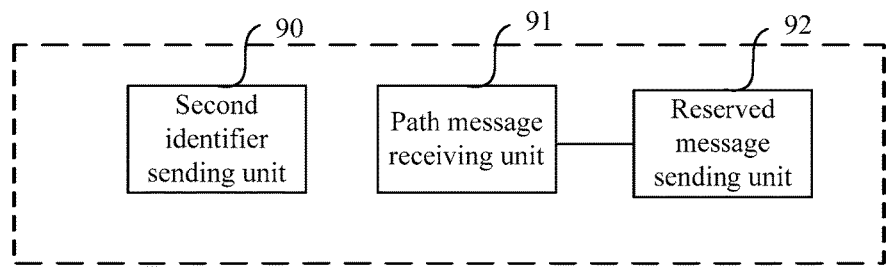
FIG. 8 is a schematic structural diagram of a routing device according to an embodiment of the present invention.

FIG. 8 is a schematic structural diagram of a first routing device according to an embodiment of the present invention. As shown in FIG. 8, the first routing device in this embodiment includes: a second identifier sending unit 90, a path message receiving unit 91, and a reserved message sending unit 92.

The second identifier sending unit 90 is configured to send a first identifier to a second routing device, so that the second routing device acquires first path information according to the first identifier, and establishes a second MPLS TE tunnel according to second path information that is obtained by reversing the first path information, where the first identifier is an identifier of a first MPLS TE tunnel, and the first path information is path information of the first MPLS TE tunnel. The first MPLS TE tunnel is an MPLS TE tunnel from a first VPN instance on the routing device in this embodiment to a second VPN instance on the second routing device; the second MPLS TE tunnel is an MPLS TE tunnel from the second VPN instance to the first VPN instance.

The path message receiving unit 91 is configured to receive a path message that is sent by the second routing device and is used to establish the second MPLS TE tunnel, where the second MPLS TE tunnel is the MPLS TE tunnel from the second VPN instance to the first VPN instance, and path information of the second MPLS TE tunnel is obtained by reversing the first path information.

The reserved message sending unit 92 is configured to send to the second routing device a reserved message corresponding to the path message. The path message and the reserved message are both messages in the RSVP-TE.

The second MPLS TE tunnel and the first MPLS TE tunnel are in reverse directions and co-routed.

Optionally, the path message receiving unit 91 is connected to the reserved message sending unit 92.

The first routing device may establish, with the second routing device, the second MPLS TE tunnel that is reverse to and co-routed with the first MPLSTE tunnel if a network condition permits, thereby solving or reducing multiple kinds of problems caused by non-co-routing during BFD. The second identifier sending unit 90 is configured to help the second routing device acquire the second path information, and the path message receiving unit 91 and the reserved message sending unit 92 are configured to establish the second MPLS TE tunnel.

The routing device in this embodiment may be a PE, but is limited to that.

Figure 9:
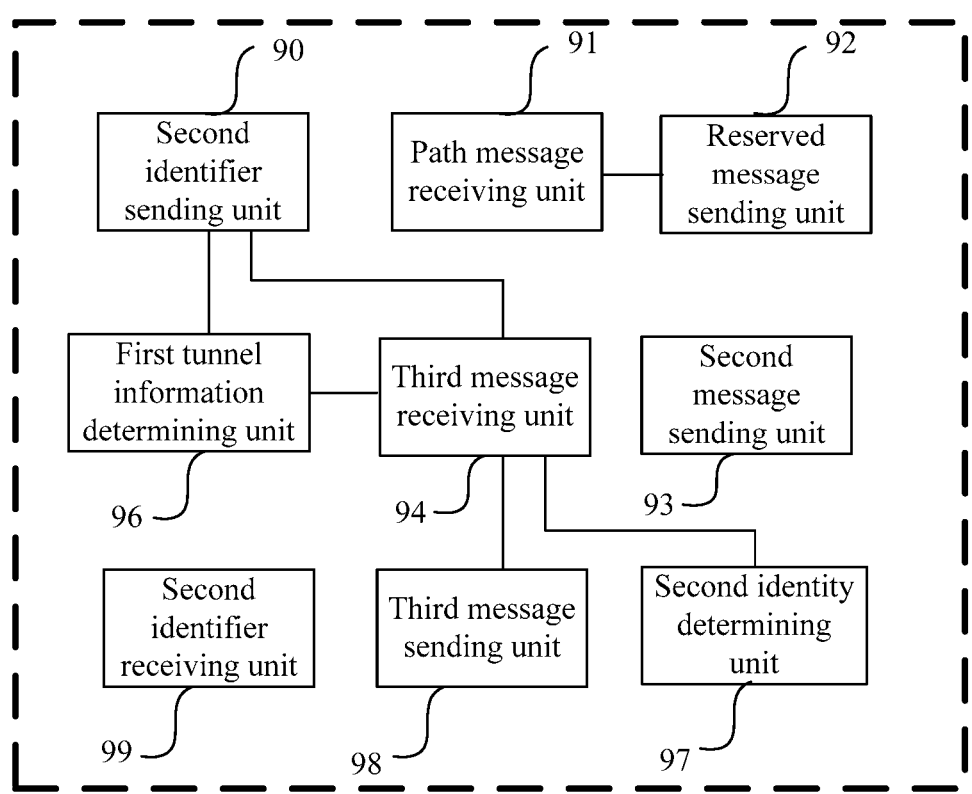
FIG. 9 is a schematic structural diagram of a routing device according to an embodiment of the present invention.

FIG. 9 is a schematic structural diagram of a routing device according to an embodiment of the present invention. This embodiment may be implemented based on the embodiment shown in FIG. 8. As shown in FIG. 9, the device in this embodiment also includes: the second identifier sending unit 90, the path message receiving unit 91, and the reserved message sending unit 92. Optionally, the first routing device in this embodiment may further include: a third message sending unit 98.

The third message sending unit 98 is configured to send tunnel establishing policy instruction information, where the tunnel establishing policy instruction information is used to instruct the second routing device to directly use the second path information to establish the second MPLS TE tunnel, or, the tunnel establishing policy instruction information is used to instruct, when a link and/or node in the second path information meets a constraint of the first tunnel attribute information, the second routing device to use the second path information to establish the second MPLS TE tunnel, or, the tunnel policy instruction information is used to instruct, when the link and/or node in the second path information does not meet the constraint of the first tunnel attribute information, the second routing device to use the third path information calculated according to the first tunnel attribute information, to establish the third MPLS TE tunnel. The first tunnel attribute information may be attribute information that is required for establishing the first MPLS TE tunnel by the routing device in this embodiment, or attribute information that is preconfigured by the second routing device and required for establishing the second MPLS TE tunnel, or default attribute information that is required for establishing the second MPLS TE tunnel by the second routing device.

Optionally, a service between the first VPN instance and the second VPN instance may be an L3VPN service.

When the service between the first VPN instance and the second VPN instance is an L3VPN service, the first routing device in this embodiment further includes: a second message sending unit 93, a third message receiving unit 94, and a first tunnel information determining unit 96.

The second message sending unit 93 is configured to send a first BGP update message to the second routing device, where the first BGP update message includes a first VPN instance identifier and a first RT, the first VPN instance identifier is used to identify the first VPN instance on the routing device in this embodiment, and the first RT is an RT of the first VPN instance.

The third message receiving unit 94 is configured to receive a second BGP update message sent by the second routing device, where the second BGP update message includes a second VPN instance identifier and a second RT, where the second VPN instance identifier is used to identify the second VPN instance on the second routing device, the second RT is an RT of the second VPN instance, and the second BGP update message is sent after the second routing device determines that the first RT is equal to the second RT. Optionally, the third message receiving unit 94 is connected to the second identifier sending unit 90. The first tunnel information determining unit 96 is configured to: after it is determined that the first RT is equal to the second RT, determine the first identifier according to the first VPN instance identifier and the second VPN instance identifier, where the first identifier is the tunnel identifier of the first MPLS TE tunnel from the first VPN instance to the second VPN instance. Optionally, the first tunnel information determining unit 96 is connected to the second identifier sending unit 90. Optionally, the first tunnel information determining unit 96 is connected to the third message receiving unit 94.

Based on what is described above, the second identifier sending unit 90 is specifically configured to send a third BGP update message to the second routing device, where the third BGP update message includes the first identifier. Optionally, the second identifier sending unit 90 is configured to send the third BGP update message to the second routing device after it is determined that the first RT is equal to the second RT.

Optionally, the third BGP update message may further include: the first VPN instance identifier, the first RT, and the second VPN instance identifier.

Further, the second message sending unit 93 may specifically be configured to encapsulate the first RT in attribute information in the first BGP update message, encapsulate the first VPN instance identifier in a network side reachability information NLRI object in the first BGP update message, and then send to the second routing device the first BGP update message in which the first RT and the first VPN instance identifier are encapsulated. Alternatively, the second message sending unit 93 may specifically be configured to encapsulate the first RT and the first VPN instance identifier in an NLRI object in the first BGP update message, and then send to the second routing device the first BGP update message in which the first RT and the first VPN instance identifier are encapsulated.

Correspondingly, the third message receiving unit 94 may specifically be configured to receive the second BGP update message, parse the second BGP update message, acquire the second RT from attribute information in the second BGP update message, and acquire the second VPN instance identifier from an NLRI object in the second BGP update message. Alternatively, the third message receiving unit 94 may specifically be configured to receive the second BGP update message, parse the second BGP update message, and acquire the second VPN instance identifier and the second RT from an NLRI object in the second BGP update message.

Optionally, the routing device in this embodiment may further include: a second identity determining unit 97.

The second identity determining unit 97 is configured to determine, according to the first VPN instance identifier and a value of the second VPN instance identifier that is received by the third message receiving unit 94, that the first VPN instance is a service active role. Optionally, the second identity determining unit 97 is connected to the third message receiving unit 94.

Optionally, the first VPN instance identifier in this embodiment may include a first RD and a first IP address, where the first RD is an RD of the first VPN instance, and the first IP address is an IP address of the routing device in this embodiment.

Correspondingly, the second VPN instance identifier may include a second RD and a second IP address, where the second RD is an RD of the second VPN instance, and the second IP address is an IP address of the second routing device.

Optionally, the routing device may further include: a second identifier receiving unit 99.

The second identifier receiving unit 99 is configured to receive a fifth BGP update message sent by the second routing device, where the fifth BGP update message includes the first VPN instance identifier, the second VPN instance identifier, the second RT, and a second identifier, and the second identifier is an identifier of the second MPLS TE tunnel.

Optionally, the service between the first VPN instance and the second VPN instance may be an L2VPN service. When the service between the first VPN instance and the second VPN instance is an L2VPN service, the second identifier sending unit 90 may specifically be configured to send an LDP label distribution message or a fourth BGP update message to the second routing device, where the LDP label distribution message or fourth BGP update message includes the first identifier.

The foregoing functional units in this embodiment may be used to perform a corresponding process in the foregoing MPLS TE tunnel establishing method embodiment, a specific working principle is not further described, and reference may be made to the description of the method embodiment.

In this embodiment, the first routing device provides the second routing device with the identifier of the MPLS TE tunnel from the first VPN instance on the first routing device to the second VPN instance on the second routing device, so that the second routing device may acquire, according to the identifier, the path information of the MPLS TE tunnel from the first VPN instance to the second VPN instance, that is, the first path information, and the second routing device obtains the path information, that is, the second path information, by reversing the acquired path information. The first routing device receives the path message that is used to establish the second MPLS TE tunnel, sends the reserved message, and if a network condition permits, establishes, with the second routing device and according to the RSVP-TE, the second MPLS TE tunnel that is reverse to and co-routed with the first MPLS TE tunnel, which can reduce or solve multiple kinds of problems that are triggered during BFD because forward and reverse tunnels are not co-routed. In an optional manner of this embodiment, the first routing device instructs the second routing device to establish, when the second MPLS TE tunnel cannot be established, the third MPLS TE tunnel, and the third MPLS TE tunnel and the first MPLS TE tunnel are in reverse directions and partially co-routed, so as to reduce, to some extent, the multiple kinds of problems caused by non-co-routing during the BFD.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A Multiprotocol Label Switching traffic engineering (MPLS TE) tunnel establishing method, comprising:
    receiving, by a second routing device, a first Border Gateway Protocol (BGP) update message sent by a first routing device, wherein the first BGP update message comprises a first virtual private network (VPN) instance identifier, the first VPN instance identifier is used to identify a first VPN instance on the first routing device;
    sending, by the second routing device, a second BGP update message to the first routing device, wherein the second BGP update message comprises a second VPN instance identifier, wherein the second VPN instance identifier is used to identify a second VPN instance on the second routing device;
    receiving, by the second routing device, a third BGP update message sent by the first routing device, wherein the third BGP update message comprises a first identifier, and the first identifier is an identifier of a first MPLS TE tunnel, and the first MPLS TE tunnel is an MPLS TE tunnel from the first VPN instance to the second VPN instance;
    acquiring, by the second routing device, first path information according to the first identifier, wherein the first path information is path information of the first MPLS TE tunnel; and
    reversing, by the second routing device, the first path information to acquire second path information, and establishing a second MPLS TE tunnel according to the second path information, wherein the second MPLS TE tunnel is an MPLS TE tunnel from the second VPN instance to the first VPN instance.

2. The MPLS TE tunnel establishing method according to claim 1, wherein the first BGP update message further comprises a first import route target (RT), and the first import RT is an import RT of the first VPN instance, wherein the second BGP update message further comprises a second import RT, wherein the second import RT is an import RT of the second VPN instance, before the sending the second BGP update message to the first routing device, the method further comprises:
    determining, by the second routing device, a service peer relationship between the first VPN instance and the second VPN instance according to the first import RT and a second export RT, wherein the second export RT is an export RT of the second VPN instance.

3. The MPLS TE tunnel establishing method according to claim 1, wherein the third BGP update message further comprises: the first VPN instance identifier, a first export RT, and the second VPN instance identifier.

4. The MPLS TE tunnel establishing method according to claim 1, wherein after the receiving, by the second routing device, the first BGP update message sent by the first routing device, the method further comprises:
    parsing the first BGP update message, acquiring the first import RT from attribute information in the first BGP update message, and acquiring the first VPN instance identifier from a network layer reachability information (NLRI) object in the first BGP update message; or, parsing the first BGP update message, and acquiring the first VPN instance identifier and the first import RT from an NLRI object in the first BGP update message.

5. The MPLS TE tunnel establishing method according to claim 1, wherein attribute information in the second BGP update message comprises a second import route target (RT), and an NLRI object in the second BGP update message comprises the second VPN instance identifier; or
wherein an NLRI object in the second BGP update message comprises the second import RT and the second VPN instance identifier.

6. The MPLS TE tunnel establishing method according to claim 1, wherein:
the first VPN instance identifier comprises a first route distinguisher (RD) and a first Internet Protocol (IP) address, wherein the first RD is an RD of the first VPN instance, and the first IP address is an IP address of the first routing device; and
the second VPN instance identifier comprises a second RD and a second IP address, wherein the second RD is an RD of the second VPN instance, and the second IP address is an IP address of the second routing device.

7. The MPLS TE tunnel establishing method according to claim 1, wherein the acquiring, by the second routing device, the first path information according to the first identifier comprises:
determining, by the second routing device according to the first identifier and a first correspondence, the first MPLS TE tunnel identified by the first identifier, wherein the first correspondence is a correspondence between the first identifier and the first MPLS TE tunnel; and
querying, by the second routing device, a second correspondence according to the identifier of the first MPLS TE tunnel, to acquire the first path information, wherein the second correspondence is a correspondence between the identifier of the first MPLS TE tunnel and the first path information.

8. The MPLS TE tunnel establishing method according to claim 1, wherein the acquiring, by the second routing device, the first path information according to the first identifier comprises:
querying, by the second routing device, a correspondence between the first identifier and the first path information according to the first identifier, to acquire the first path information, wherein the correspondence between the first identifier and the first path information is acquired by the second routing device from a received path message that is used to establish the first MPLS TE tunnel.

9. The MPLS TE tunnel establishing method according to claim 1, wherein the establishing, by the second routing device, the second MPLS TE tunnel according to the second path information comprises:
directly using, by the second routing device, the second path information to establish the second MPLS TE tunnel;
or,
determining, by the second routing device, whether a link or a node or at least one of a link and a node in the second path information meets a constraint of first tunnel attribute information, and if the second routing device determines that the link and/or the node or the at least one of the link and the node in the second path information meets the constraint of the first tunnel attribute information, using the second path information to establish the second MPLS TE tunnel, wherein the first tunnel attribute information is attribute information that is required for establishing the first MPLS TE tunnel by the first routing device, or, the first tunnel attribute information is attribute information that is preconfigured by the second routing device and required for establishing the second MPLS TE tunnel, or, the first tunnel attribute information is default attribute information that is required for establishing the second MPLS TE tunnel by the second routing device.

10. The MPLS TE tunnel establishing method according to claim 9, wherein before the establishing, by the second routing device, a second MPLS TE tunnel according to the second path information, the method further comprises:
receiving, by the second routing device, tunnel establishing policy instruction information sent by the first routing device, wherein the tunnel establishing policy instruction information is used to instruct, when the at least one of the link and the node in the second path information meets the constraint of the first tunnel attribute information, the second routing device to use the second path information to establish the second MPLS TE tunnel.

11. The MPLS TE tunnel establishing method according to claim 9, wherein preconfiguring, for the second routing device, the attribute information that is required for establishing the second MPLS TE tunnel comprises:
preconfiguring, for the second routing device, a tunnel template that is used to establish the second MPLS TE tunnel, and using the tunnel template to configure, for the second routing device, the attribute information that is required for establishing the second MPLS TE tunnel; and
wherein the attribute information that is required for establishing the second MPLS TE tunnel is the first tunnel attribute information.

12. The MPLS TE tunnel establishing method according to claim 1, wherein the first MPLS TE tunnel comprises a primary label switched path (LSP) and a backup LSP;
the acquiring, by the second routing device, first path information according to the first identifier comprises:
acquiring, by the second routing device according to role information of LSPs in the first MPLS TE tunnel, first primary path information corresponding to the primary LSP in the first MPLS TE tunnel and first backup path information corresponding to the backup LSP in the first MPLS TE tunnel; and
the reversing, by the second routing device, the first path information to acquire second path information, and establishing a second MPLS TE tunnel according to the second path information comprises:
reversing, by the second routing device, the first primary path information to acquire second primary path information corresponding to the primary LSP in the first MPLS TE tunnel; and
reversing, by the second routing device, the first backup path information, to acquire second backup path information corresponding to the backup LSP in the first MPLS TE tunnel;
establishing, by the second routing device, a primary LSP in the second MPLS TE tunnel according to the second primary path information; and
establishing, by the second routing device, a backup LSP in the second MPLS TE tunnel according to the second backup path information.

13. The MPLS TE tunnel establishing method according to claim 1, further comprising:

sending, by the second routing device, a fifth BGP update message to the first routing device, wherein the fifth BGP update message comprises the first VPN instance identifier, the second VPN instance identifier, the second import RT, and a second identifier, and the second identifier is an identifier of the second MPLS TE tunnel.

14. A second routing device, comprising computer executable instructions stored on a non-transitory computer-readable medium, wherein execution of the by a processor causes the processor to:
receive a first Border Gateway Protocol (BGP) update message sent by a first routing device, wherein the first BGP update message comprises a first virtual private network (VPN) instance identifier, the first VPN instance identifier is used to identify a first VPN instance on the first routing device;
send a second BGP update message to the first routing device, wherein the second BGP update message comprises a second VPN instance identifier, wherein the second VPN instance identifier is used to identify a second VPN instance on the second routing device;
receive a third BGP update message sent by the first routing device, wherein the third BGP update message comprises a first identifier, and the first identifier is an identifier of a first Multiprotocol Label Switching traffic engineering (MPLS TE) tunnel, and the first MPLS TE tunnel is an MPLS TE tunnel from the first VPN instance to the second VPN instance;
acquire first path information according to the first identifier, wherein the first path information is path information of the first MPLS TE tunnel; and
reverse the first path information to acquire second path information, and establish a second MPLS TE tunnel according to the second path information, wherein the second MPLS TE tunnel is an MPLS TE tunnel from the second VPN instance to the first VPN instance.

15. The second routing device according to claim 14, wherein wherein the first BGP update message further comprises a first import route target (RT), and the first import RT is an import RT of the first VPN instance, wherein the second BGP update message further comprises a second import RT, wherein the second import RT is an import RT of the second VPN instance, the instructions when executed by the processor further cause the processor to:
determine a service peer relationship between the first VPN instance and the second VPN instance according to the first import RT and a second export RT, wherein the second export RT is an export RT of the second VPN instance.

16. The second routing device according to claim 14, wherein the third BGP update message further comprises: the first VPN instance identifier, a first import route target (RT), and the second VPN instance identifier.

17. The second routing device according to claim 14, wherein the instructions when executed by the processor further cause the processor to:
parse the first BGP update message, acquire the first import RT from attribute information in the first BGP update message, and acquire the first VPN instance identifier from a network layer reachability information (NLRI) object in the first BGP update message; or
receive the first BGP update message, parse the first BGP update message, and acquire the first VPN instance identifier and the first import RT from an NLRI object in the first BGP update message.

18. The second routing device according to claim 14, wherein attribute information in the second BGP update message comprises the second import RT, and an NLRI object in the second BGP update message comprises the second VPN instance identifier; or
wherein an NLRI object in the second BGP update message comprises the second import RT and the second VPN instance identifier.

19. The second routing device according to claim 14, wherein:
the first VPN instance identifier comprises a first route distinguisher (RD) and a first Internet Protocol (IP) address, wherein the first RD is an RD of the first VPN instance, and the first IP address is an IP address of the first routing device; and
the second VPN instance identifier comprises a second RD and a second IP address, wherein the second RD is an RD of the second VPN instance, and the second IP address is an IP address of the second routing device.

20. The second routing device according to claim 14, wherein the instructions when executed by the processor further cause the processor to: determine, according to the first identifier and a first correspondence, the first MPLS TE tunnel identified by the first identifier, and query a second correspondence according to the identifier of the first MPLS TE tunnel, to acquire the first path information, wherein the first correspondence is a correspondence between the first identifier and the first MPLS TE tunnel, and the second correspondence is a correspondence between the identifier of the first MPLS TE tunnel and the first path information.

21. The second routing device according to claim 14, wherein the instructions when executed by the processor further cause the processor to:
query a correspondence between the first identifier and the first path information according to the first identifier, to acquire the first path information, wherein the correspondence between the first identifier and the first path information is acquired by the second routing device from a received path message that is used to establish the first MPLS TE tunnel.

22. The second routing device according to claim 14, wherein the instructions when executed by the processor further cause the processor to:
determine whether at least one of a link and a node in the second path information meets a constraint of first tunnel attribute information, and after determining that the at least one of the link and the node in the second path information meets the constraint of the first tunnel attribute information, use the second path information to establish the second MPLS TE tunnel, wherein the first tunnel attribute information is attribute information that is required for establishing the first MPLS TE tunnel by the first routing device, or, the first tunnel attribute information is attribute information that is preconfigured by the second routing device and required for establishing the second MPLS TE tunnel, or, the first tunnel attribute information is default attribute information that is required for establishing the second MPLS TE tunnel by the second routing device.

23. The second routing device according to claim 22, wherein the instructions when executed by the processor further cause the processor to:
receive tunnel establishing policy instruction information sent by the first routing device, wherein the tunnel establishing policy instruction information is used to instruct, when the at least one of the link and the node in the second path information meets the constraint of the first tunnel attribute information, the second routing device to use the second path information to establish the second MPLS TE tunnel.

24. The second routing device according to claim 22, wherein the instructions when executed by the processor further cause the processor to use a preconfigured tunnel template that is used to establish the second MPLS TE tunnel, to configure the attribute information that is required for establishing the second MPLS TE tunnel; and
wherein the attribute information that is required for establishing the second MPLS TE tunnel is the first tunnel attribute information.

25. The second routing device according to claim 14, wherein the first MPLS TE tunnel comprises a primary label switched path (LSP) and a backup LSP;
wherein the instructions when executed by the processor further cause the processor to:
acquire, according to role information of LSPs in the first MPLS TE tunnel, first primary path information corresponding to the primary LSP in the first MPLS TE tunnel and first backup path information corresponding to the backup LSP in the first MPLS TE tunnel; and
reverse the first primary path information to acquire second primary path information corresponding to the primary LSP in the first MPLS TE tunnel;
reverse the first backup path information to acquire second backup path information corresponding to the backup LSP in the first MPLS TE tunnel;
establish a primary LSP in the second MPLS TE tunnel according to the second primary path information; and
establish a backup LSP in the second MPLS TE tunnel according to the second backup path information.

26. The second routing device according to claim 14, wherein the instructions when executed by the processor further cause the processor to send a fifth BGP update message to the first routing device, wherein the fifth BGP update message comprises the first VPN instance identifier, the second VPN instance identifier, the second export RT, and a second identifier, and the second identifier is an identifier of the second MPLS TE tunnel.

* * * * *